US00RE49057E

(19) United States
(12) Reissued Patent
Harada et al.

(10) Patent Number: US RE49,057 E
(45) Date of Reissued Patent: May 3, 2022

(54) POSITION DETECTION APPARATUS, DROPLET DISCHARGING APPARATUS, METHOD FOR DETECTING POSITION, AND MEDIUM

(71) Applicant: Ricoh Company, Ltd., Tokyo (JP)

(72) Inventors: Yasunari Harada, Kanagawa (JP); Jun Watanabe, Tokyo (JP); Tetsuyoshi Nakata, Kanagawa (JP); Hiroki Tanaka, Kanagawa (JP); Toshiaki Hosokawa, Kanagawa (JP); Shunsuke Shitaoka, Kanagawa (JP)

(73) Assignee: Ricoh Company, Ltd., Tokyo (JP)

(21) Appl. No.: 16/870,058

(22) Filed: Jul. 13, 2020

Related U.S. Patent Documents

Reissue of:
(64) Patent No.: 9,962,927
Issued: May 8, 2018
Appl. No.: 15/448,962
Filed: Mar. 3, 2017

(30) Foreign Application Priority Data

Mar. 17, 2016 (JP) ..... 2016-053538
Dec. 26, 2016 (JP) ..... 2016-251726

(51) Int. Cl.

| | |
|---|---|
| ***B41J 2/045*** | (2006.01) |
| ***H04N 5/232*** | (2006.01) |
| ***B41J 3/46*** | (2006.01) |
| ***B41J 3/36*** | (2006.01) |
| ***B41J 3/39*** | (2006.01) |

(52) U.S. Cl.
CPC ..... *B41J 2/04508* (2013.01); *B41J 2/04586* (2013.01); *B41J 3/36* (2013.01); *B41J 3/39* (2013.01); *B41J 3/46* (2013.01); *H04N 5/232* (2013.01); *H04N 5/23287* (2013.01)

(58) Field of Classification Search
CPC ..... B41J 2/04508; B41J 2/04586; B41J 3/36; B41J 3/39; B41J 3/46; H04N 5/232; H04N 5/23287
See application file for complete search history.

(56) References Cited

U.S. PATENT DOCUMENTS 8,240,801 B2 8/2012 Bledsoe et al.
8,277,043 B2 * 10/2012 Hattori ..... B41J 3/445 346/143
8,351,062 B2 * 1/2013 Bledsoe ..... H04N 1/107 347/109

(Continued)

FOREIGN PATENT DOCUMENTS

JP 2004-106330 4/2004
JP 2008-168580 7/2008

(Continued)

*Primary Examiner* — Tuan H Nguyen
(74) *Attorney, Agent, or Firm* — IPUSA, PLLC

(57) ABSTRACT

A position detection apparatus configured to detect a position on a movement surface of a mounted object having the position detection apparatus mounted thereon, includes a moved amount detector configured to detect an amount of movement on the movement surface; a posture detector configured to detect at least a posture of the mounted object on the movement surface; and a position calculator configured to calculate the position of the mounted object, based on the amount of movement and the posture.

20 Claims, 20 Drawing Sheets

(56) References Cited

U.S. PATENT DOCUMENTS

| | | | | |
|---|---|---|---|---|
| 8,801,134 | B2 * | 8/2014 | Bledsoe | B41J 3/36 347/14 |
| 9,205,671 | B1 * | 12/2015 | Simmons | G06F 3/1292 |
| 9,352,598 | B2 * | 5/2016 | Nakata | B41J 29/38 |
| 9,440,452 | B2 | 9/2016 | Harada et al. | |
| 9,555,645 | B1 * | 1/2017 | Mealy | B41J 3/36 |

FOREIGN PATENT DOCUMENTS

| | | | | |
|---|---|---|---|---|
| JP | 2008168580 | * | 7/2008 | B41J 3/36 |
| JP | 2009-133695 | | 6/2009 | |
| JP | 2010-522650 | | 7/2010 | |
| JP | 2013-014114 | | 1/2013 | |
| JP | 2016-010969 | | 1/2016 | |
| JP | 2016-060103 | | 4/2016 | |

* cited by examiner

POSITION DETECTION APPARATUS, DROPLET DISCHARGING APPARATUS, METHOD FOR DETECTING POSITION, AND MEDIUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. patent application Ser. No. 15/448,962, now U.S. Pat. No. 9,962,927.*

BACKGROUND OF THE INVENTION

1. Field of the Invention

The present disclosure relates to a position detection apparatus, a droplet discharging apparatus, a method for detecting a position, and a medium.

2. Description of the Related Art

Printers that convey a sheet and discharge ink at times when the sheet reaches an image forming position to form an image, have been known. For printers, needs for smaller sizes and portability have been increasing as downsized notebook PCs and smart devices have become popular. As such, printers having a sheet conveyance system omitted to be downsized (referred to as "handy mobile printers (HMPs) ", below) are coming into practical use. An HMP does not have the sheet conveyance system installed; the HMP is moved by a person to scan the surface of a sheet, and to discharge ink.

The HMP detects its own position on the surface of the sheet, and discharges the ink to form an image depending on the position. As a mechanism for detecting the position, a conventional HMP has been known that has two navigation sensors mounted on the bottom face (see, for example, Patent document 1). The navigation sensor is a sensor that optically detects fine edges on the surface of a sheet, to detect the amount of movement every cycle time. Having the two navigation sensors mounted makes it possible for the HMP to detect the angle of rotation in the direction horizontal to the surface of the sheet.

However, such a conventional HMP has a problem; it is difficult to reduce the size of the bottom part. First, even if having only one navigation sensor mounted, the HMP can detect a position. Two sensors are required for calculating the angle of rotation of the HMP with respect to the surface of the sheet, and for calculating the position based on the angle of the rotation. Moreover, to improve the precision of the detected angle of rotation, it is preferable to have a certain interval between the two navigation sensors. For these reasons, it is difficult to reduce the size of the bottom part of a conventional HMP.

SUMMARY OF THE INVENTION

According to an embodiment, a position detection apparatus configured to detect a position on a movement surface of a mounted object having the position detection apparatus mounted thereon, includes a moved amount detector configured to detect an amount of movement on the movement surface; a posture detector configured to detect at least a posture of the mounted object on the movement surface; and a position calculator configured to calculate the position of the mounted object, based on the amount of movement and the posture.

DETAILED DESCRIPTION OF THE EMBODIMENTS

In the following, embodiments will be described with reference to the drawings.

According to an embodiment, it is possible to provide a position detection apparatus whose size of the bottom part can be reduced.

First Application Example

Figure 1A:
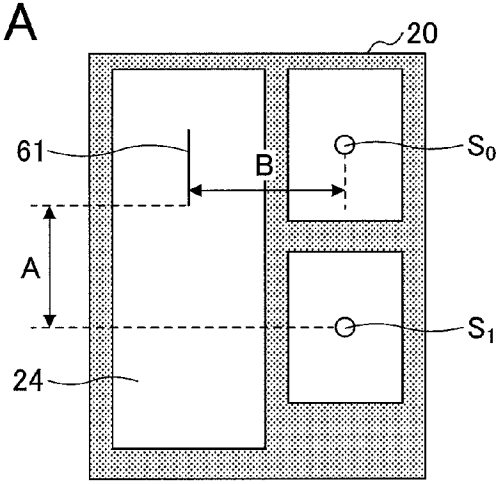
FIGS. 1A-1D are examples of diagrams illustrating an overview of a configuration of an HMP according to an embodiment.
Figure 1C:
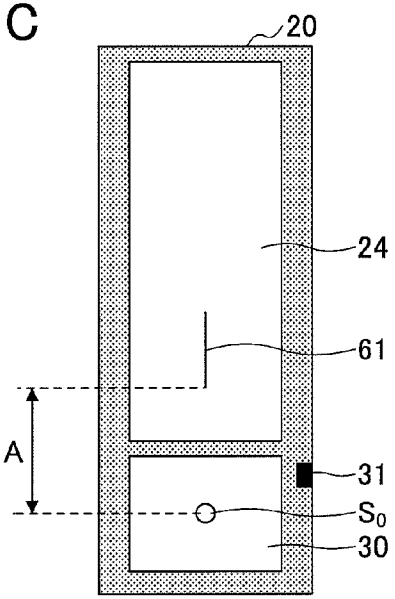

First, general features of a handy mobile printer (referred to as an "HMP", below) will be described according to the embodiment using FIGS. 1A-1D. FIGS. 1A-1D are examples of diagrams illustrating an overview of a configuration of the HMP according to the embodiment. FIG. 1A illustrates a configuration diagram of a conventional HMP 20 illustrated for comparison. The conventional HMP 20 includes an IJ recording head 24 and two navigation sensors 30 (referred to as the "navigation sensors $S_0$-$S_1$" when the distinction is required, below).

Figure 1B:
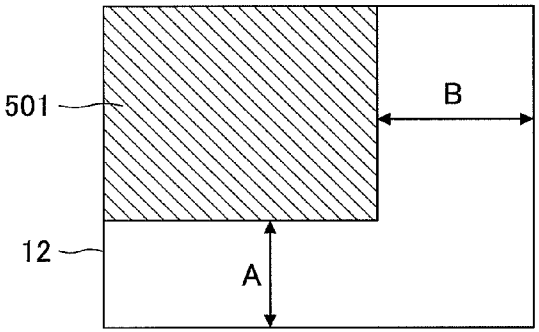

FIG. 1B illustrates an image formable area 501 of the conventional HMP 20. The HMP 20 in FIG. 1A has an IJ recording head 24 on the left side, and the two navigation sensors $S_0$-$S_1$ arranged vertically on the right side. The interval between the navigation sensor $S_1$ and the lower end of the nozzle 61 is A mm, and the interval between the nozzle 61 and the navigation sensors $S_0$-$S_1$ is B mm. To prevent the navigation sensors $S_0$-$S_1$ from going out of a print medium 12, the HMP 20 cannot be moved to the area of the print medium 12 within B mm from the right end. Also, since the interval is A mm between the navigation sensor S, and the lower end of the nozzle 61, the HMP 20 cannot be moved to the area of the print medium 12 within A mm from the lower end. Thus, areas where printing cannot be executed are generated on the lower part and the side part of the print medium 12.

Figure 1D:
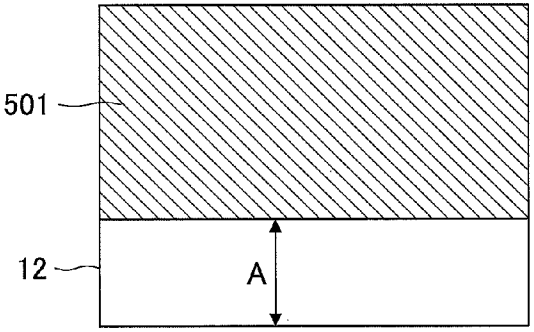

FIG. 10 illustrates a configuration diagram of an HMP 20 in the embodiment. The HMP 20 in the embodiment includes an IJ recording head 24, a single navigation sensor $S_0$, and a gyro sensor 31. FIG. 1D illustrates an image formable area 501 of the HMP 20 in the embodiment. It is assumed that the interval between the navigation sensor $S_1$ and the lower end of the nozzle 61 is A mm. To prevent the navigation sensor $S_0$ from going out of the print medium 12, the HMP 20 cannot be moved to the area of the print medium 12 within A mm from the lower end. However, since the interval in the lateral direction between the nozzle 61 and the navigation sensor $S_0$ is zero, the HMP 20 can be moved from the left end to the right end of the print medium 12. Thus, the non-printable area is generated only on the lower part of the print medium 12 as illustrated in FIG. 1D.

As can be clearly seen by comparing FIG. 1B with FIG. 1D, having the gyro sensor 31 mounted on the HMP 20 makes it possible to reduce the number of navigation sensors to one, and hence, to reduce the size of the bottom face. Consequently, the image formable area 501 can be extended.

<About Terms>

The "size of the bottom face" is the size of an area that surrounds the navigation sensor 30 and the nozzle 61, or the size of the bottom face of the HMP 20 that cannot be made smaller anymore due to the restriction of the surrounding area. An actual size of the bottom face of the HMP 20 may be larger than the area surrounding the navigation sensor 30 and the nozzle 61, and may be determined taking operability, design, and the like into consideration.

A "mounted object" refers to an object having a position detection apparatus mounted. A "mounted object" may be an object by which a position can be detected on a movement surface. For example, the HMP 20 is an example of a mounted object. Also, since the position detection apparatus can detect a moved distance, a distance measuring device may be an example of a mounted object.

The "movement surface" just needs to be a surface on which the HMP 20 can move, which includes a plane and a curved surface. Specifically, the print medium 12 is a movement surface, but it is not limited as such.

Moreover, a "posture of an object" means the degrees of freedom representing the angles of rotation among six degrees of freedom of the object (a rigid body), namely, the angles of rotation around three axes that pass through the center of gravity of the rigid body, and perpendicular to each other. Among these, the posture of the object in a plane is represented by the angle of rotation around an axis perpendicular to the plane.

Also, "calculating a position" means obtaining information about a position by executing calculation on certain data, and "detecting a position" means obtaining information about a position regardless of the process. However, both are the same in terms of obtaining information about a position, and will not be strictly distinguished in the embodiments.

<Image Formation by HMP 20>

Figure 2A:
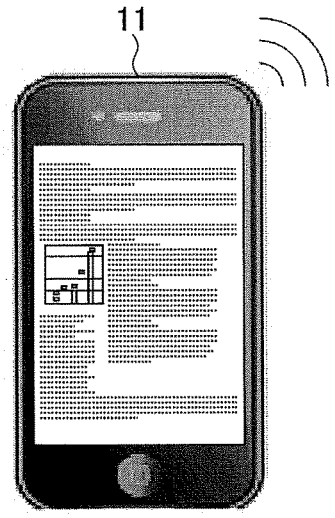
FIGS. 2A-2B are examples of diagrams schematically illustrating image forming by an HMP.
Figure 2B:
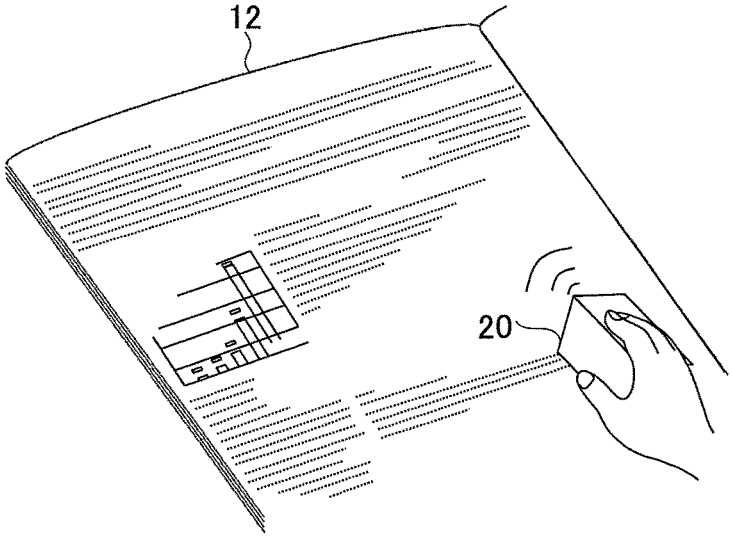

FIGS. 2A-2B are examples of diagrams schematically illustrating image forming by the HMP 20. Image data is transmitted to the HMP 20, for example, from an image data output device 11 such as a smart phone and a PC (Personal Computer). The user grips the HMP 20 freehand and moves the HMP 20 to scan the surface of the print medium 12 (for example, a standard size sheet or a notebook), while keeping the HMP 20 not to float over the print medium 12.

As will be described in detail later, the HMP 20 detects a position by the navigation sensor $S_0$ and the gyro sensor 31, and when moved to a targeting discharge position, discharges ink of a color to be discharged onto the targeting discharge position. Since the place on which the ink has been already discharged is masked (not to be the targeting discharge position anymore), the user can move the HMP 20 to scan the print medium 12 in any direction to form the image.

It is preferable to maintain the HMP 20 so as not to float over the print medium 12, because the navigation sensor $S_0$ detects the amount of movement by using light reflected from the print medium 12. If the HMP 20 floats over the print medium 12, the reflected light cannot be detected, and the amount of movement cannot be detected. Also, the navigation sensor $S_0$ gone out of the print medium 12 may not be able to detect the reflected light due to the thickness of the print medium 12, or even if the reflected light is detected, the position may be shifted. Therefore, it is preferable to keep the navigation sensor $S_0$ on the print medium 12 while scanning, and to have the nozzle 61 and the navigation sensor $S_0$ located together on the print medium 12 as described above.

<Example of Configuration>

Figure 3:
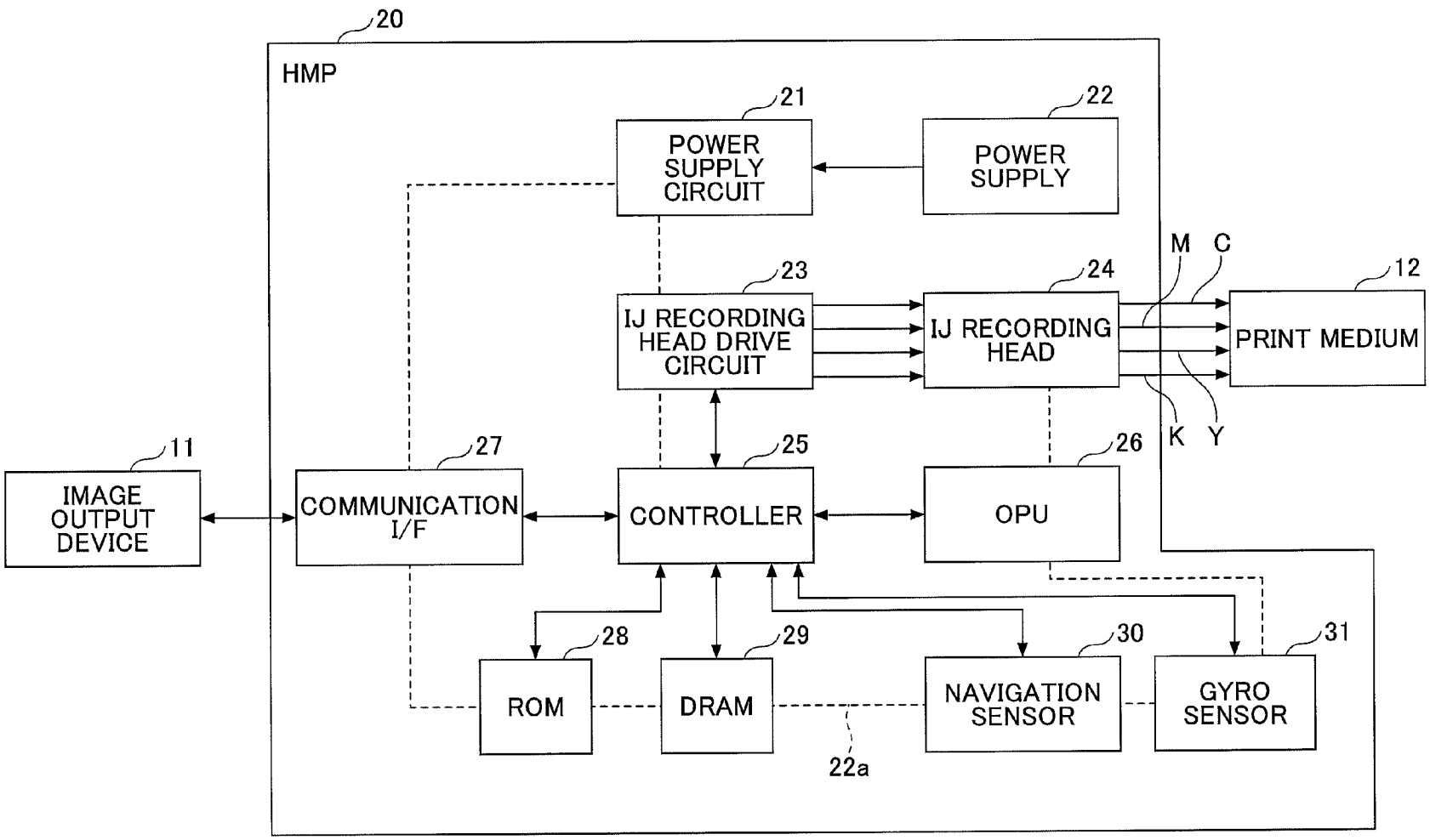
FIG. 3 is an example of a hardware configuration diagram of an HMP.

FIG. 3 is an example of a hardware configuration diagram of the HMP 20. The HMP 20 is an example of a droplet discharging apparatus or an image forming apparatus that forms an image on a print medium 12. The overall operation of the HMP 20 is controlled by a controller 25 to which a communication I/F (Interface) 27, an IJ (Inkjet) recording head drive circuit 23, an OPU (Operation Panel Unit) 26, a ROM (Read-Only Memory) 28, a DRAM (Dynamic Random Access Memory) 29, the navigation sensor 30, and the gyro sensor 31 are electrically connected. The HMP 20 further includes a power source 22 and a power source circuit 21 to be driven by electric power. The electric power generated by the power source circuit 21 is supplied to the communication I/F 27, the IJ recording head drive circuit 23, the OPU 26, the ROM 28, the DRAM 29, the IJ recording head 24, the controller 25, the navigation sensor 30, and the gyro sensor 31 by wiring designated by dotted lines 22a.

A battery is mainly used as the power source 22. Alternatively, a solar cell, a commercial power source (an AC power supply), a fuel cell, or the like may be used. The power source circuit 21 distributes the electric power supplied by the power source 22 to the parts of the HMP 20. The power source circuit 21 also boosts or steps down the voltage of the power source 22 to be suitable for the respective parts of the HMP 20. In addition, if the power source 22 is a rechargeable battery, the power source circuit 21 detects a connection to an AC power supply and connects the AC power supply with a charge circuit of the battery to charge the power source 22.

The communication I/F 27 receives of image data from the image data output device 11 such as a smartphone and a PC (Personal Computer). The communication I/F 27 is, for example, a communication device corresponding to communication standards such as a wireless LAN, Bluetooth (registered trademark), NFC (Near Field Communication), infrared communication, 3G (cellular phone), and LTE (Long Term Evolution). Other than such wireless communication standards, the communication I/F 27 may be a communication device corresponding to cable communication using a wired LAN, a USB cable, and the like.

The ROM 28 stores firmware to control the hardware of the HMP 20, drive waveform data of the IJ recording head 24 (data specifying voltage change to discharge droplets), initial setting data of the HMP 20, and the like.

The DRAM 29 is used for storing image data received by the communication I/F 27, and storing the firmware loaded from the ROM 28. Therefore, the DRAM 29 is used as a work memory when the CPU 33 runs the firmware.

The navigation sensor 30 is a sensor to detect the amount of movement of the HMP 20 every predetermined cycle time. The navigation sensor 30 includes, for example, a light source such as a light-emitting diode (LED) and a laser, and an imaging sensor to capture an image of the print medium 12. When having the HMP 20 scan over the print medium 12, fine edges on the print medium 12 are detected (imaged) one after another, and the amount of movement is obtained by analyzing the distance between the edges. In the embodiment, only one navigation sensor 30 is mounted on the bottom face of the HMP 20. Conventionally, two sensors are mounted. However, the HMP 20 having two navigation sensors 30 may be described for the sake of comparison. Note that an acceleration sensor for more axes may be used as the navigation sensor 30, and the HMP 20 may detect the amount of movement of the HMP 20 only by the acceleration sensor.

The gyro sensor 31 is a sensor to detect angular velocity when the HMP 20 is rotated around an axis perpendicular to the print medium 12. This will be described in detail later.

The OPU 26 includes an LED to display a state of the HMP 20, and a switch for the user to make the HMP 20 start image forming. However, the elements are not limited to these; a liquid crystal display may be included, and a touch panel may be further included. Also, a voice input function may be provided.

The IJ recording head drive circuit 23 generates a drive waveform (voltage) to drive the IJ recording head 24 by using the drive waveform data described above. A drive waveform depending on the size of ink droplets and the like can be generated.

The IJ recording head 24 is a head for discharging ink. The IJ recording head 24 illustrated in the figure is capable of discharging four colors (CMYK) of ink, but the color may be monochrome, or five or more colors may be discharged. One row (or more rows) of nozzles 61 (discharging parts) may be arranged for each color for discharging the ink. Also, ink discharging may be implemented by a piezoelectric system, a thermal system, or other than those. The IJ recording head 24 is a functional part that discharges or jets out liquid from the nozzles 61. Liquid to be discharged just needs to have an appropriate viscosity and surface tension so as to be discharged from the IJ recording head 24.

The liquid is not specifically limited, but preferably has the viscosity less than or equal to 30 mPa·s at normal temperature and normal pressure, or when heated or cooled. More specifically, available liquid may be solution, suspension, emulsion, or the like that includes solvent such as water and organic solvent; colorants such as dye and pigment; functional materials such as polymerizable compounds, resin, and surfactants; biocompatible materials such as DNA, amino acid, protein, and calcium; and edible materials such as natural colorant. Such liquid may be used as, for example, ink for the inkjet; surface treatment liquid; liquid for forming elements such as electronic devices and light-emitting devices, and resist patterns of an electronic circuit; and material liquid for three-dimensional molding; and the like.

The controller 25 includes the CPU 33 to control the HMP 20 as a whole. Based on the amount of movement detected by the navigation sensor 30 and the angular velocity detected by the gyro sensor 31, the controller 25 determines the positions of the nozzles 61 of the IJ recording head 24, an image to be formed depending on the positions, and whether to have each nozzle 61 discharge the ink at the position. The controller 25 will be described in detail next.

Figure 4:
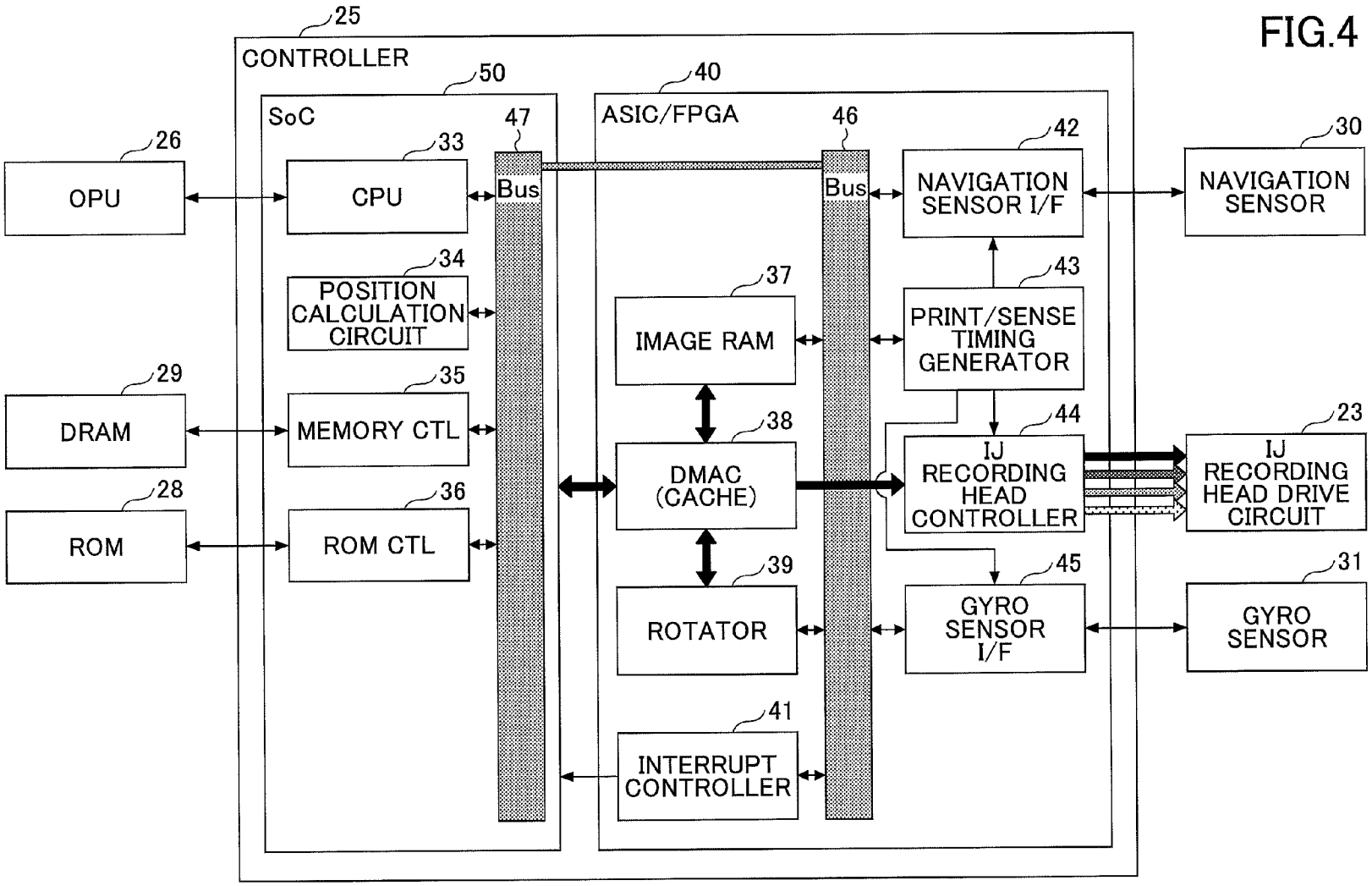
FIG. 4 is an example of a diagram illustrating a configuration of a controller.

FIG. 4 is an example of a diagram illustrating a configuration of the controller 25. The controller 25 includes an SoC 50 and an ASIC/FPGA 40. The ASIC/FPGA 40 and the SoC 50 communicates with each other via buses 46 and 47. The "ASIC/FPGA" 40 is meant to be designed in one of the packaging technologies of ASIC, FPGA, and any other packaging technologies. Also, the SoC 50 and the ASIC/FPGA 40 may be implemented on a single chip or board, not divided into separate chips. The number of chips or boards may be three or more.

The SoC 50 includes functions of a CPU 33, a position calculation circuit 34, a memory controller (CTL) 35, and a ROM controller 36, which are connected with each other via the bus 47. Note that elements included in the SoC 50 are not limited to these.

Also, the ASIC/FPGA 40 includes an Image RAM 37, a DMAC 38, a rotator 39, an interrupt controller 41, a navigation sensor I/F 42, a print/sense timing generator 43, an IJ recording head controller 44, and a gyro sensor I/F 45, which are connected with each other via the bus 46. Note that elements included in the ASIC/FPGA 40 are not limited to these.

The CPU 33 runs firmware (a program) loaded into the DRAM 29 from the ROM 28, to control operations of the position calculation circuit 34, the memory controller 35, and the ROM controller 36 in the SoC 50. The CPU 33 also controls operations of the Image RAM 37, the DMAC 38, the rotator 39, the interrupt controller 41, the navigation sensor I/F 42, the print/sense timing generator 43, the IJ recording head controller 44, the gyro sensor I/F 45, and the like in the ASIC/FPGA 40.

The position calculation circuit 34 calculates the position (coordinate information) of the HMP 20, based on the amount of movement detected by the navigation sensor 30 every sampling cycle, and the angular velocity detected by the gyro sensor 31 every sampling cycle. The position of the HMP 20 is strictly the positions of the nozzles 61, which can be calculated once the position of the navigation sensor 30 is determined. In the present application example, the position of the navigation sensor 30 is assumed to be the position of the navigation sensor $S_0$ unless otherwise specified. The position calculation circuit 34 also calculates a targeting discharge position. Note that the CPU 33 may implement functions of the position calculation circuit 34 by software.

The position of the navigation sensor 30 is calculated, for example, based on a predetermined origin (the initial position of the HMP 20 when image forming is started) as the reference, as will be described later. The position calculation circuit 34 also estimates the direction of movement and acceleration based on a difference between a past position and a latest position, to predict, for example, the position of the navigation sensor 30 at the next discharge timing. This make is possible to discharge ink while preventing a delay behind the user's scanning operation.

The memory controller 35 is an interface with the DRAM 29, to make a request for data to the DRAM 29, to transmit the obtained firmware to the CPU 33, and to transmit obtained image data to the ASIC/FPGA 40.

The ROM controller 36 is an interface with the ROM 28, to make a request for data to the ROM 28, and to transmit obtained data to the ASIC/FPGA 40.

The rotator 39 rotates the image data obtained by the DMAC 38 depending on the head that discharges ink, the nozzle positions in the head, the inclination of the head due to an installation error and the like. The DMAC 38 outputs the image data after the rotation to the IJ recording head controller 44.

The Image RAM 37 temporarily stores the image data obtained by the DMAC 38. In other words, a certain amount of image data is buffered to be read out depending on the position of the HMP 20.

The IJ recording head controller 44 applies a dither process and the like to image data (bit map data), to convert the image data into a collection of points that represent an image by the sizes and density. Thus, the image data becomes data represented by the discharge positions and the sizes of the points. The IJ recording head controller 44 outputs a control signal depending on the sizes of the points to the IJ recording head drive circuit 23. As described above, the IJ recording head drive circuit 23 generates a drive waveform (voltage) by using the drive waveform data corresponding to the control signal.

The navigation sensor I/F 42 communicates with the navigation sensor 30 to receive the amount of movement ΔX' and ΔY', which will be described later, as information from the navigation sensor 30, and to store the values in an internal register.

The print/sense timing generator 43 indicates timing at which the navigation sensor I/F 42 and the gyro sensor I/F 45 read information to, and indicates drive timing to the IJ recording head controller 44. The cycle of the timing to read information is longer than the cycle of the timing to discharge ink. The IJ recording head controller 44 determines whether to have the nozzles 61 discharge the ink, and if there is a targeting discharge position to which the ink to be discharged, discharges the ink; or if not, does not discharge the ink.

The gyro sensor I/F 45 obtains the angular velocity detected by the gyro sensor 31 when the timing generated by the print/sense timing generator 43 has come, and stores the value in the register.

The interrupt controller 41 detects that the navigation sensor I/F 42 has completed communication with the navigation sensor 30, and outputs an interrupt signal to indicate the completion to the SoC 50. In response to this interruption, the CPU 33 obtains ΔX' and ΔY' having stored in the internal register by the navigation sensor I/F 42. The interrupt controller 41 also has a status indication function about errors and the like. Similarly, the interrupt controller 41 detects that the gyro sensor I/F 45 has completed communication with the gyro sensor 31, and outputs an interrupt signal to indicate the completion to the SoC 50.

<Gyro Sensor 31>

Figure 5:
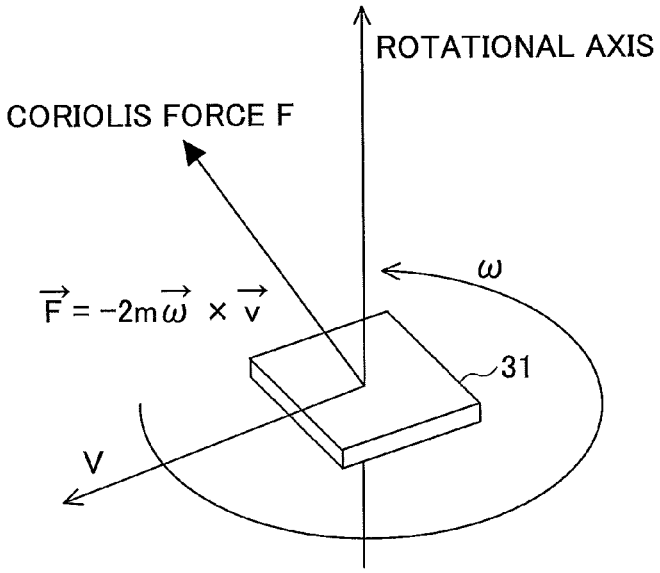
FIG. 5 is an example of a diagram illustrating principles of detecting angular velocity by a gyro sensor.

FIG. 5 is an example of a diagram illustrating principles of detecting angular velocity by the gyro sensor 31. When rotational movement acts on a moving object, Coriolis force is generated in a direction perpendicular to both the moving direction and to the axis of rotation of the object.

To move the object, the gyro sensor 31 generates velocity v (a vector) by vibrating a MEMS (Micro Electro Mechanical System) element. When rotational movement angular velocity ω (vector) from the outside acts on the vibrating MEMS element having the mass m, the MEMS element receives the Coriolis force. The Coriolis force F can be represented as follows.

$$F=-2m\omega\times v$$

where "x" represents the outer product of vectors, and the Coriolis force F is directed to a direction perpendicular to both the moving direction and to the axis of rotation of the body as described above. The MEMS element has, for example, an electrode having a comb-teeth-like structure, and the gyro sensor 31 senses displacement caused by the Coriolis force F as a change of the electrostatic capacity. The signal representing the Coriolis force F is amplified and filtered in the gyro sensor 31, and calculated as the angular velocity to be output. In other words, the angular velocity co can be taken out based on F, m, and v, which are known.

<About Navigation Sensor 30>

Figure 6:
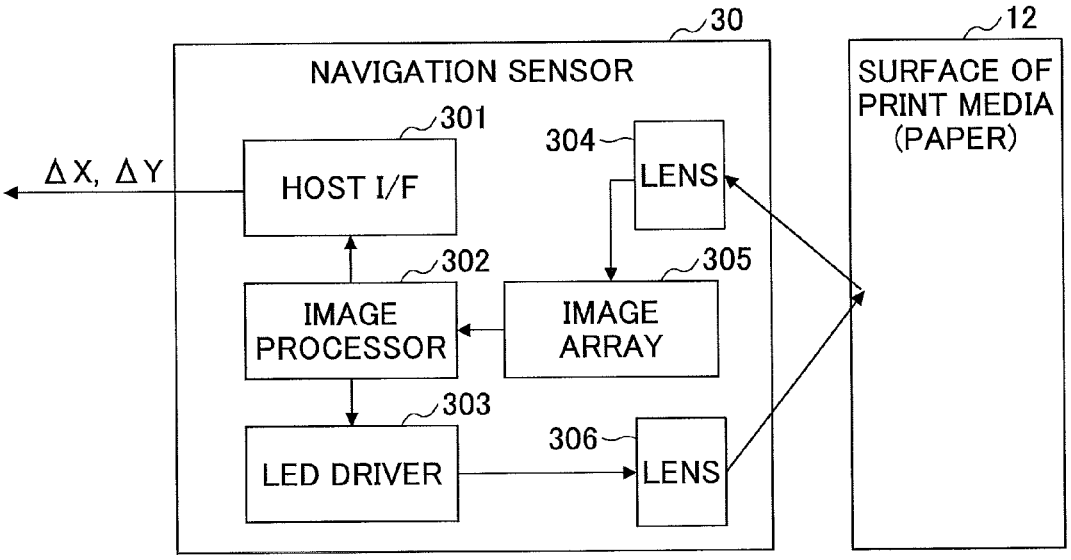
FIG. 6 is a diagram illustrating an example of a hardware configuration of a navigation sensor.

FIG. 6 is a diagram illustrating an example of a hardware configuration of the navigation sensor 30. The navigation sensor 30 includes a host I/F 301, an image processor 302, an LED driver 303, two lenses 304 and 306, and an image array 305. The LED driver 303 is a unified device of a control circuit and an LED, and emits LED light in response to a command from the image processor 302. The image array 305 receives reflected LED light from the print medium 12 through the lens 304. The two lenses 304 and 306 are disposed so that the focal point comes on to the surface of the print medium 12 optically.

The image array 305 includes photodiodes or the like having the sensitivity at the wavelength of the LED light, to generate image data from the received LED light. The image processor 302 obtains the image data and calculates the moved distance (ΔX' and ΔY' described above) of the navigation sensor 30 from the image data. The image processor 302 outputs the calculated moved distance to the controller 25 via the host I/F 301.

The light-emitting diode (LED) used as the light source is useful for a print medium 12 having a coarse face such as paper. This is because a coarse face generates shadow, and by using the shadow as the characteristic part, it is possible to calculate the moved distance in the X-axis direction and the Y-axis direction precisely. On the other hand, for a print medium 12 whose surface is smooth or transparent, a semiconductor laser (LD) generating a laser beam may be used as the light source. This is because the semiconductor laser can form, for example, a striped pattern on the print medium 12 that can be used as the characteristic part, and the moved distance can be calculated precisely based on the characteristic part.

Figure 7A:
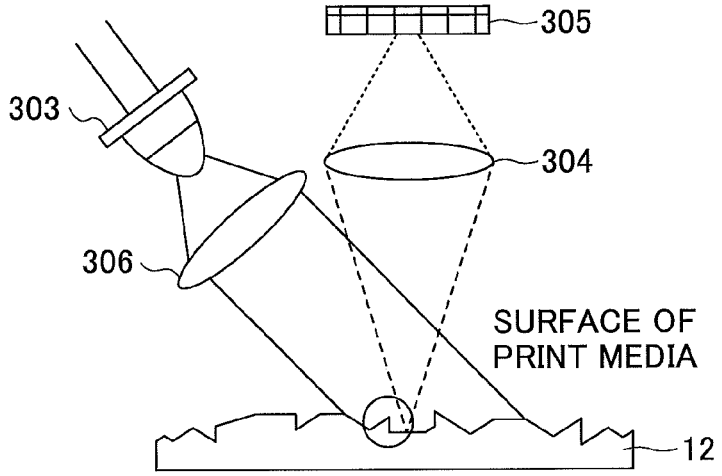
FIGS. 7A-7B are examples of diagrams illustrating a method for detecting an amount of movement by a navigation sensor.
Figure 7B:
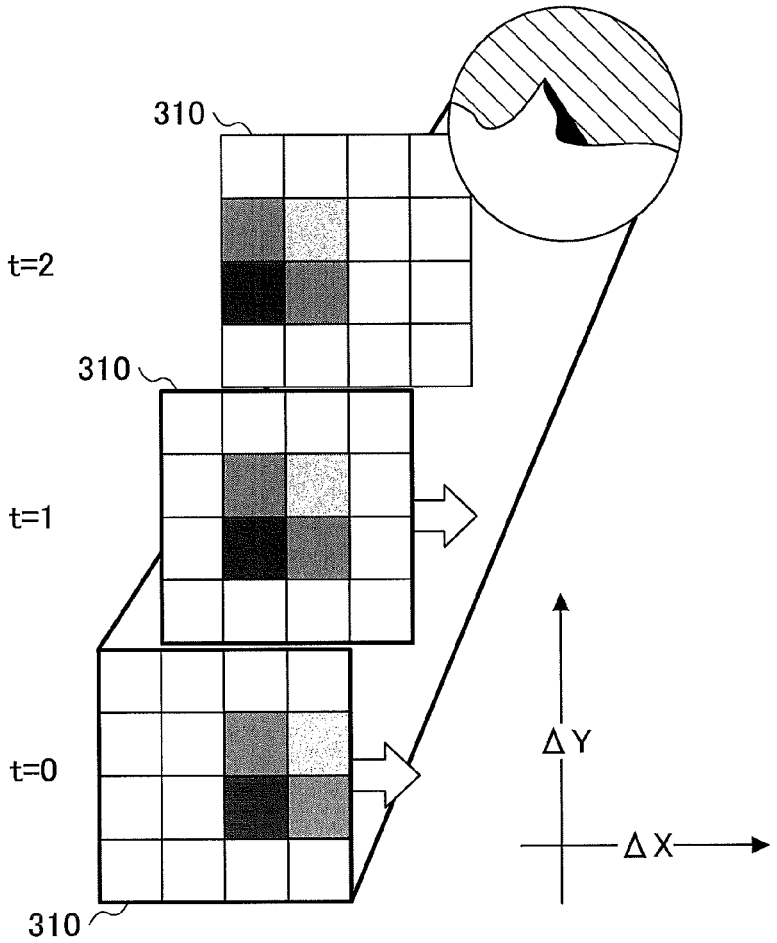

Next, operations of the navigation sensor 30 will be described using FIGS. 7A-7B. FIGS. 7A-7B are examples of diagrams illustrating a method for detecting the amount of movement by the navigation sensor 30. The light emitted by the LED driver 303 irradiates the surface of the print medium 12 through the lens 306. The surface of the print medium 12 has fine concavities and convexities having various shapes as illustrated in FIG. 7A. Therefore, the shadows are generated in various shapes.

The image processor 302 receives reflected light through the lens 304 and the image array 305 every predetermined sampling timing, to obtain the image data 310. The image processor 302 generates a matrix from the image data 310 by a predetermined resolution as illustrated in FIG. 7B. In other words, the image processor 302 divides the image data 310 into multiple rectangular areas. Then, the image processor 302 compares the image data 310 obtained at a current sampling timing with the image data 310 obtained at the previous sampling timing, to detect the number of rectangular areas that have been passed through, and to calculate the moved distance. Assume that the HMP 20 has moved in the direction designated by ΔX in FIG. 7B. Comparing the image data 310 at t=0 with the data at t=1, a shape on the right side at t=0 matches a shape at the center at t=1. Thus, it can be understood that the shape has moved in the X-direction negatively, which means the HMP 20 has moved in the X-direction positively by one square. This is the same for the image data 310 at time t=1 and t=2.

<IJ Recording Head Drive Circuit 23>

Figure 8:
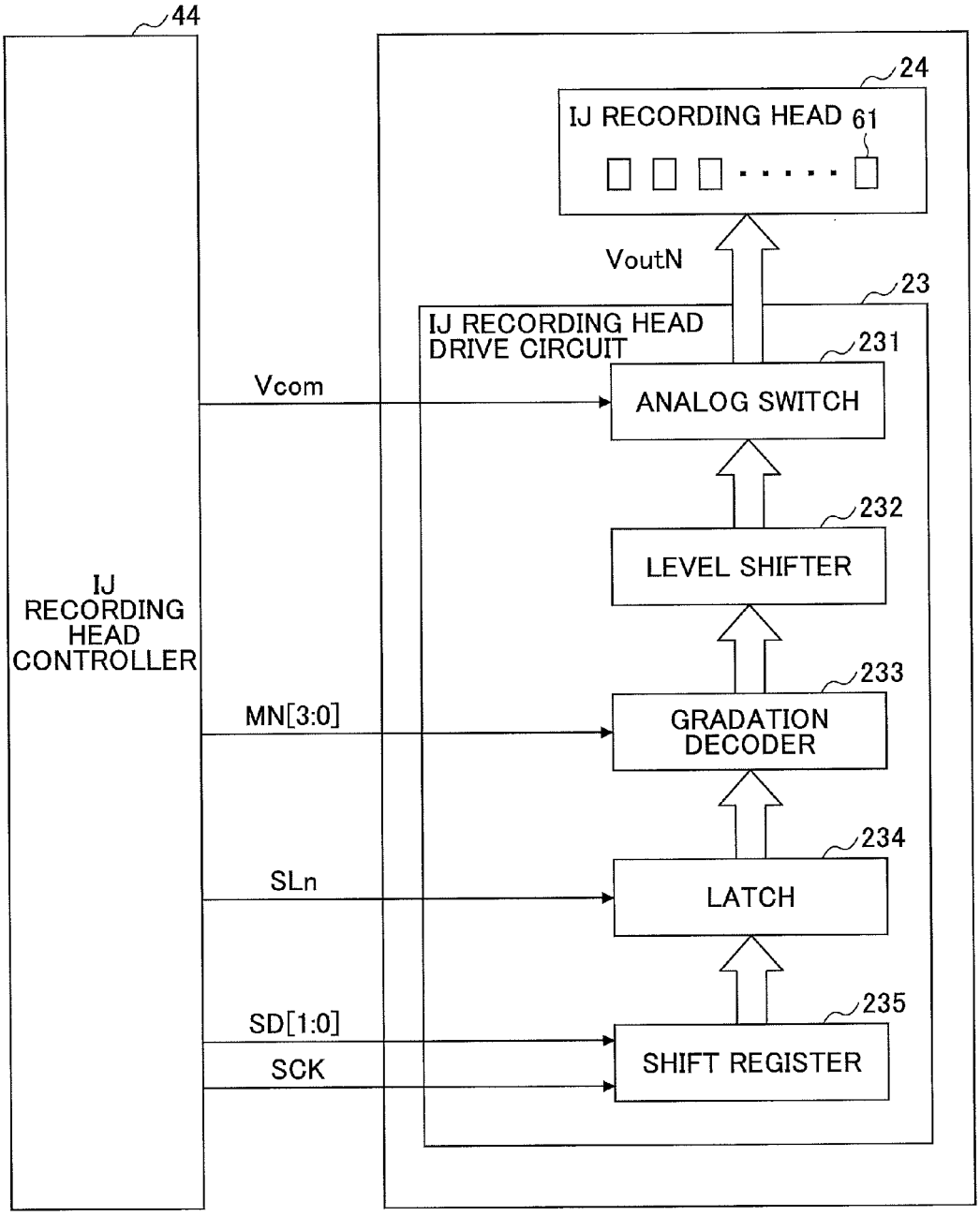
FIG. 8 is an example of a configuration diagram of an IJ recording head drive circuit.

FIG. 8 is an example of a configuration diagram of the IJ recording head drive circuit 23. First, the IJ recording head 24 includes multiple nozzles 61, and each of the nozzles 61 has an actuator provided. The actuator may be either of a thermal type or a piezoelectric type. The thermal type heats ink in the nozzle 61 to expand the ink, and discharges a droplet of the ink from the nozzle 61 by the expansion. The piezoelectric type applies pressure to the nozzle wall by a piezoelectric device to push ink out of the nozzle 61, and discharges a droplet of the ink.

The IJ recording head drive circuit 23 includes analog switches 231, a level shifter 232, a gradation decoder 233, latches 234, and a shift register 235. The IJ recording head controller 44 transfers image data SD constituted with serial data items for the number of the nozzles 61 of the IJ recording head 24 (the number of actuators is the same), to the shift register 235 of the IJ recording head drive circuit 23 by using an image data transfer clock SCK.

Having completed the transfer, the IJ recording head controller 44 stores the items of the image data SD in the latches 234 provided for the respective nozzles 61 by image data latch signals SLn, respectively.

After having latched the image data SD, the IJ recording head controller 44 outputs a head drive waveform Vcom to discharge droplets of the ink having respective gradation levels from the nozzles 61, to the analog switch 231. At this moment, the IJ recording head controller 44 gives a head drive mask pattern MN as a gradation control signal to the gradation decoder 233, and makes the head drive mask pattern MN transition to be selected in accordance with the timing of the drive waveform.

The gradation decoder 233 performs a logical operation on the gradation control signal and the latched image data, and the level shifter 232 boosts a logical level voltage signal obtained by the logical operation up to a voltage level enough to drive the analog switch 231.

The analog switch 231 receives the boosted voltage signal to be turned on or off, and this makes a drive waveform VoutN to be supplied to the actuators of the IJ recording head have a different form for the respective nozzles 61. The IJ recording head 24 discharges droplets of the ink based on this drive waveform VoutN to form an image on the print medium 12.

Note that the configuration of FIG. 8 described above is a configuration generally adopted for printers of the inkjet type. Another configuration other than the configuration in FIG. 8 may be adopted for the HMP 20 as long as droplets of ink can be discharged.

<About Nozzle Positions in IJ Recording Head>

Figure 9A:
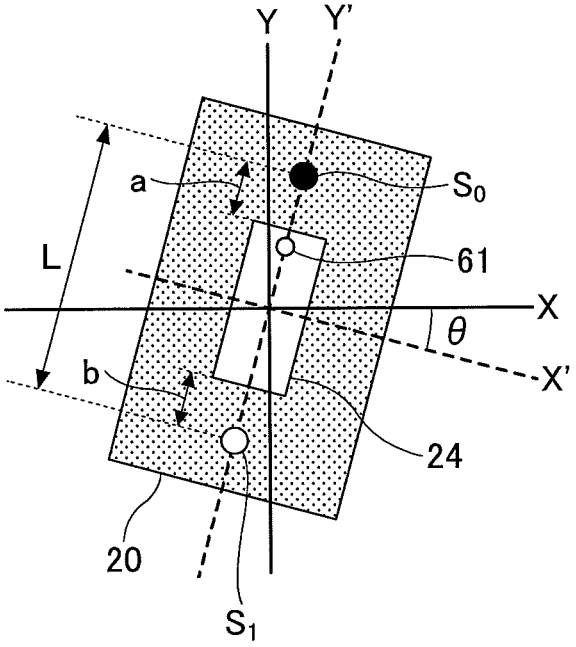
FIGS. 9A-9B are examples of plan views of an HMP.
Figure 9B:
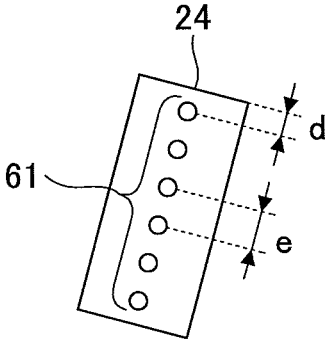

Next, nozzle positions in the IJ recording head 24 will be described using FIGS. 9A-9B. FIG. 9A is an example of a plan view of the HMP 20. FIG. 9B is an example of a diagram illustrating only the IJ recording head 24. The illustrated surface faces the print medium 12. The HMP 20 in the present embodiment has one navigation sensor $S_0$. For the sake of description, $S_1$ in FIG. 9A designates a position at which the second navigation sensor would be mounted if two navigation sensors are to be mounted. If two navigation sensors $S_0$-$S_1$ are mounted, the length between $S_0$ and $S_1$ is represented by the distance L. The longer the distance L is, the more preferable it is. This is because the longer the distance L is, the smaller the minimum detectable angle of rotation θ becomes, and hence, the smaller the error of the position of the HMP 20 becomes.

The distances from the navigation sensors ($S_0$ and $S_1$) to the IJ recording head 24 are a and b, respectively. The distance a may be equal to the distance b, or may be zero (contacts the IJ recording head 24). If only one navigation sensor 30 is mounted, the navigation sensor $S_0$ may be placed at any location around the IJ recording head 24. Therefore, the illustrated position of the navigation sensor $S_0$ is just an example. However, a shorter distance between the IJ recording head 24 and the navigation sensor $S_0$ makes it easier to reduce the size of the bottom face of the HMP 20.

As illustrated in FIG. 9B, the distance from the edge of the IJ recording head 24 to the first nozzle 61 is d, and the distance between the adjacent nozzles is e. The values of a to e are stored in the ROM 28 or the like in advance.

Once the position calculation circuit 34 and the like has calculated the position of the navigation sensor $S_0$, the position calculation circuit 34 can calculate the position of each nozzle 61 by using the distances a (or the distance b), the distance d, and the distance e.

<About Position of HMP 20 on Print Medium 12>

Figure 10A:
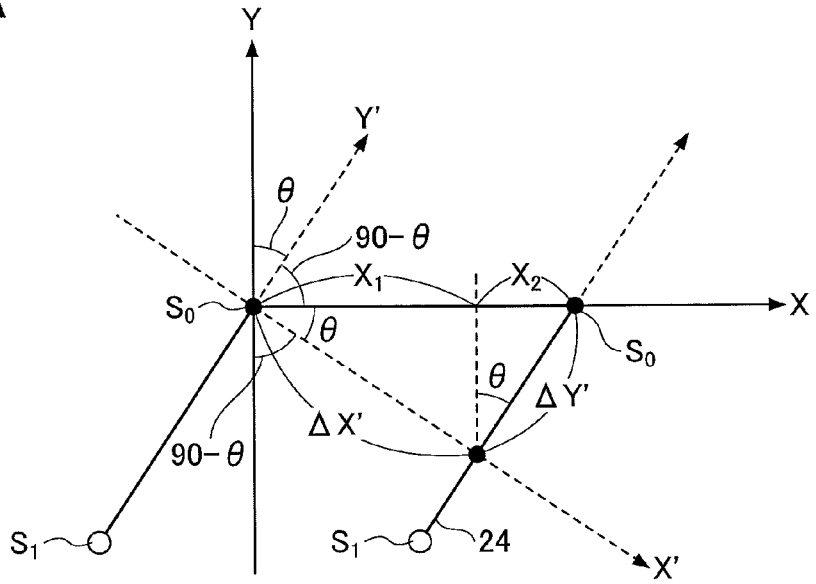
FIGS. 10A-10B are examples of diagrams illustrating a coordinate system of an HMP and a method for calculating a position.
Figure 10B:
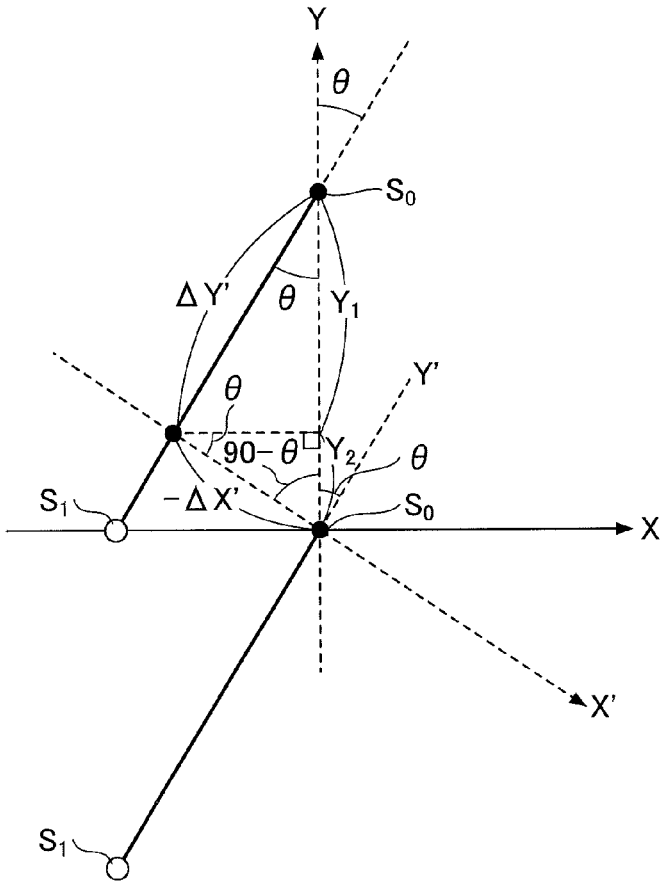

FIGS. 10A-10B are examples of diagrams illustrating a coordinate system of the HMP 20 and a method for calculating the position. In the embodiment, the X-axis is taken in a direction horizontal to the print medium 12, and the Y-axis is taken in a direction vertical to the print medium 12. The origin is set at the position of the navigation sensor $S_0$ when an operation of image forming is started. The coordinates will be referred to as the "print medium coordinates". In contrast, the navigation sensor $S_0$ outputs the amount of movement in axes of coordinates (X'-axis, Y'-axis) in FIGS. 10A-10B. In other words, the amount of movement is output by the coordinates where the Y'-axis is taken in a direction of the arranged nozzles 61, and the X'-axis is taken in a direction perpendicular to the Y'-axis.

As illustrated in FIG. 9A, a case will be described in which the HMP 20 is rotated clockwise by θ with respect to the print medium 12. Since it is difficult for the user to perform a scanning operation of the HMP 20 with no inclination at all with respect to the print medium coordinates, it is natural to consider that non-zero 8 is generated inevitably. If there is no rotation, the axes are X=X' and Y=Y'. However, if the HMP 20 rotates by the angle of rotation θ with respect to the print medium 12, the output of the navigation sensor $S_0$ does not coincide with the actual position of the HMP 20 on the print medium 12. The angle of rotation θ is positive in the clockwise direction, X and X' are positive in the rightward direction, and Y and Y' are positive in the upward direction.

FIG. 10A is an example of the diagram illustrating the X-coordinate of the HMP 20. FIG. 10A illustrates the correspondence between the amount of movement (X, Y) and (ΔX', ΔY') detected by the navigation sensor $S_0$ when the HMP 20 rotated by the angle of rotation θ has moved only in the X-direction while keeping the same angle of rotation θ. Note that if two navigation sensors 30 are mounted, the output (the amount of movement) of the two navigation sensors 30 is the same because the relative positions are fixed. The X-coordinate of the navigation sensor $S_0$ is X1+X2, and X1+X2 can be calculated from ΔX', ΔY', and the angle of rotation θ.

FIG. 10B illustrates the correspondence between the amount of movement (X, Y) and (ΔX', ΔY') detected by the navigation sensor $S_0$ when the HMP 20 rotated by the angle of rotation θ has moved only in the Y-direction while keeping the same angle of rotation θ. The Y-coordinate of the navigation sensor $S_0$ is Y1+Y2, and Y1+Y2 can be calculated from −ΔX', ΔY', and the angle of rotation θ.

Therefore, if the HMP 20 has moved in the X-direction and the Y-direction while keeping the same angle of rotation θ, ΔX' and ΔY' output by the navigation sensor $S_0$ can be converted into X and Y in the print medium coordinates by the following formulas.

$$X=\Delta X' \cos\theta+\Delta Y' \sin\theta \quad (1)$$

$$Y=-\Delta X' \sin\theta+\Delta Y' \cos\theta \quad (2)$$

<<Detection of Angle of Rotation θ>>

In the embodiment, the position calculation circuit 34 calculates the angle of rotation θ based on the output of the gyro sensor 31. However, in order to show that the position can be obtained by higher precision with a longer distance L, a method for calculating the angle of rotation θ will be described in the case where two navigation sensors 30 are mounted.

Figure 11:
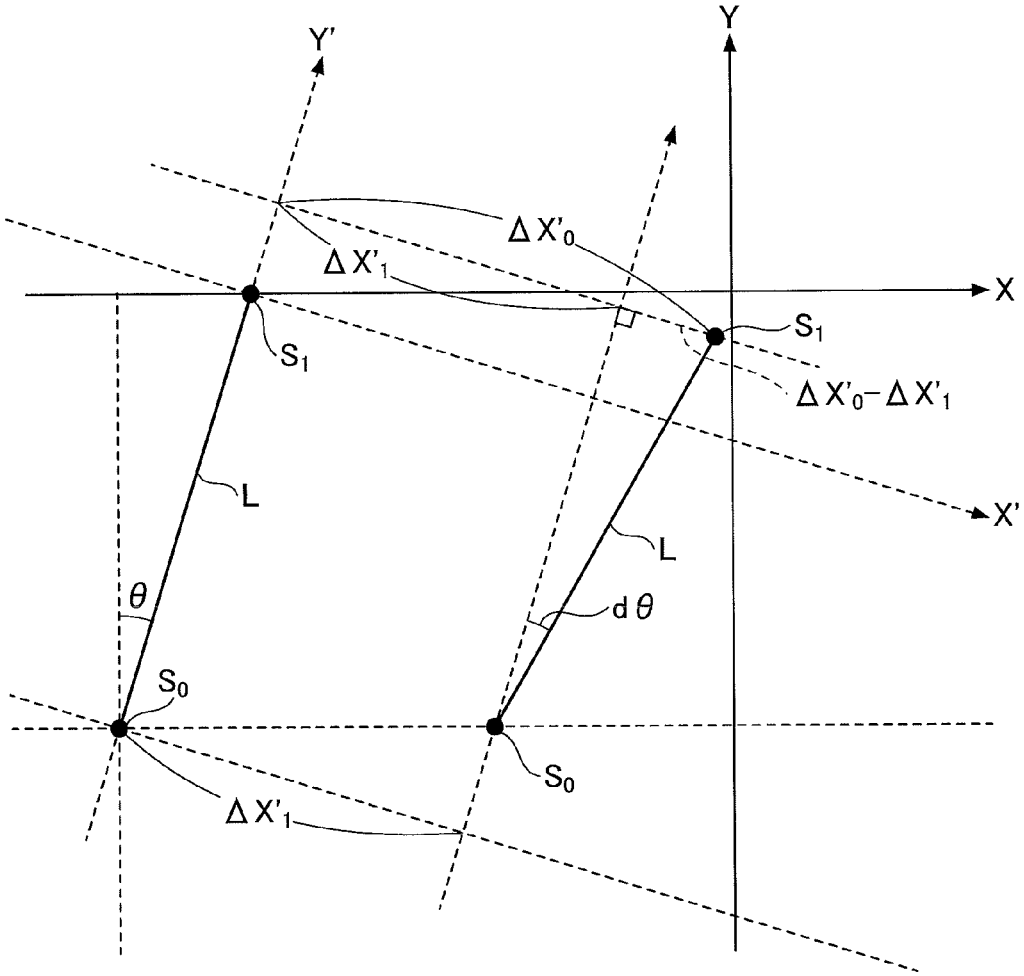
FIG. 11 is an example of a diagram illustrating a method for calculating an angle of rotation $d\theta$ of an HMP generated during image forming.

FIG. 11 is an example of a diagram illustrating a method for calculating the angle of rotation dθ of the HMP 20 generated during image forming. The angle of rotation dθ is calculated using the amount of movement ΔX' detected by the two navigation sensors $S_0$-$S_1$. Here, ΔX'0 represents the amount of movement detected by the upper navigation sensor $S_0$ on the print medium 12, and ΔX'1 represents the amount of movement detected by the lower navigation sensor $S_1$. Note that in FIG. 11, θ represents the angle of rotation that has been already obtained.

If the HMP 20 moves horizontally while rotating by dθ, the amounts of movement ΔX'0 and ΔX'1 are not the same. However, since both ΔX'0 and ΔX'1 are output as the amounts of movement in the direction perpendicular to the line connecting the two navigation sensors $S_0$-$S_1$, the difference between the amounts of movement ΔX'0 and ΔX'1 can be calculated by ΔX'0-ΔX'1. This difference is generated due to the rotation dθ of the HMP 20. Also, since "ΔX'0-ΔX'1", L, and dθ have a relationship as illustrated in FIG. 11, dθ can be represented by the following formula.

$$d\theta=\arcsin\{(\Delta X'0-\Delta X'1)/L\} \quad (3)$$

The position calculation circuit 34 can calculate the angle of rotation θ by adding up dθ. As illustrated in formulas (1)-(2), since the angle of rotation θ is used for calculating the position, the angle of rotation θ affects the precision of the position. Also, as can be seen from formula (3), it is preferable to make the distance L greater for detecting dθ by a smaller value. Thus, the distance L affects the precision of the position, but a greater distance L makes the base area of the HMP 20 larger and the image formable area 501 smaller.

Next, a method of calculation of the angle of rotation θ by using the output of the gyro sensor 31 will be described. The output of the gyro sensor 31 is the angular velocity ω represented by ω=dθ/dt where dt is assumed to be the ampling cycle. Therefore, the angle of rotation dθ can be represented by the following formula.

$$d\theta=\omega\times dt$$

Consequently, the angle of rotation θ at time t=0 to N is represented by the following formula.

$$\theta=\sum_{t=0}^{N}\omega i\times dt$$

In this way, the angle of rotation θ can be obtained by the gyro sensor 31. As represented by formulas (1)-(2), the position can be calculated using the angle of rotation θ. Once the position of the navigation sensor $S_0$ has been calculated, the position calculation circuit 34 can calculate the coordinates of each of the nozzles 61 by using the values of a to e illustrated in FIG. 9B. Note that since X in formula (1) and Y in formula (2) are the amounts of change in a sampling cycle, the current position is obtained by accumulating these X and Y, respectively.

<Targeting Discharge Position>

Figure 12:
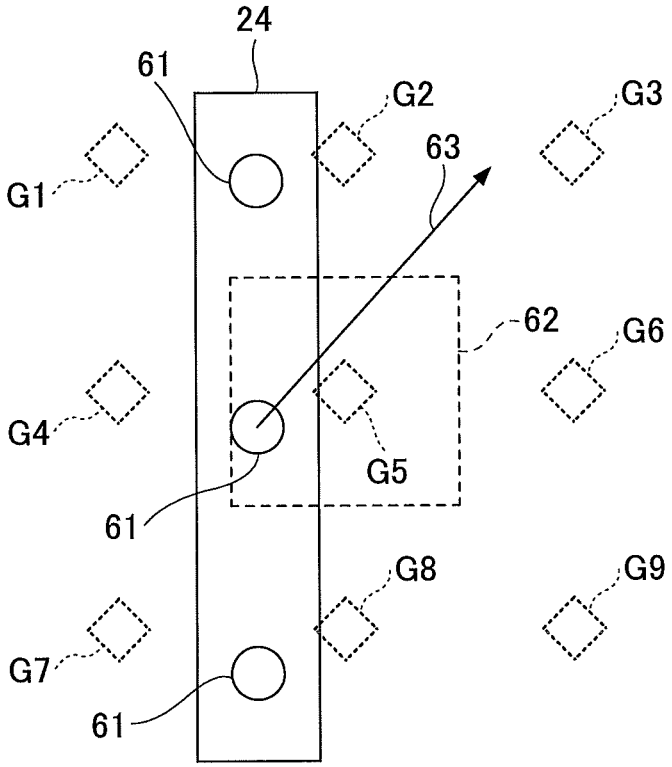
FIG. 12 is an example of a diagram illustrating a relationship between targeting discharge positions and nozzle positions.

Next, the targeting discharge position will be described using FIG. 12. FIG. 12 is an example of a diagram illustrating a relationship between the targeting discharge positions and the positions of the nozzles 61. The targeting discharge positions G1-G9 are targeting positions of the HMP 20 at which impact of droplets of the ink will be given (at which pixels will be formed). The targeting discharge positions G1-G9 can be calculated from the initial position of the HMP 20, and the resolutions in the X-axis and the Y-axis directions of the HMP 20 represented by (Xdpi, Ydpi).

For example, if the resolution is 300 dpi, the targeting discharge positions are set in the longitudinal direction of the IJ recording head 24 and in the perpendicular direction with the interval of approximately 0.084 mm between the targeting discharge positions. If there is a pixel to be discharged among the targeting discharge positions G1-G9, the HMP 20 discharges the ink on the pixel.

However, since it is difficult in practice to catch the timing at which a targeting discharge position exactly coincides with the position of the nozzle 61, the HMP 20 provides a permissible error 62 between the targeting discharge position and the current position of the nozzle 61. If the current position of the nozzle 61 comes within the permissible error 62 with respect to the targeting discharge position, the HMP 20 discharges the ink from the nozzle 61. Providing such a permissible range is to determine whether to discharge the ink or not from a nozzle 61.

Also, as designated by an arrow 63, the HMP 20 monitors the direction of movement and acceleration of the nozzle 61, and predicts the position of the nozzle 61 at the timing of the next discharge. Therefore, by comparing the predicted position with the range of the permissible error 62, the HMP 20 can prepare for the next discharge of the ink.

<Operational Steps>

Figure 13:
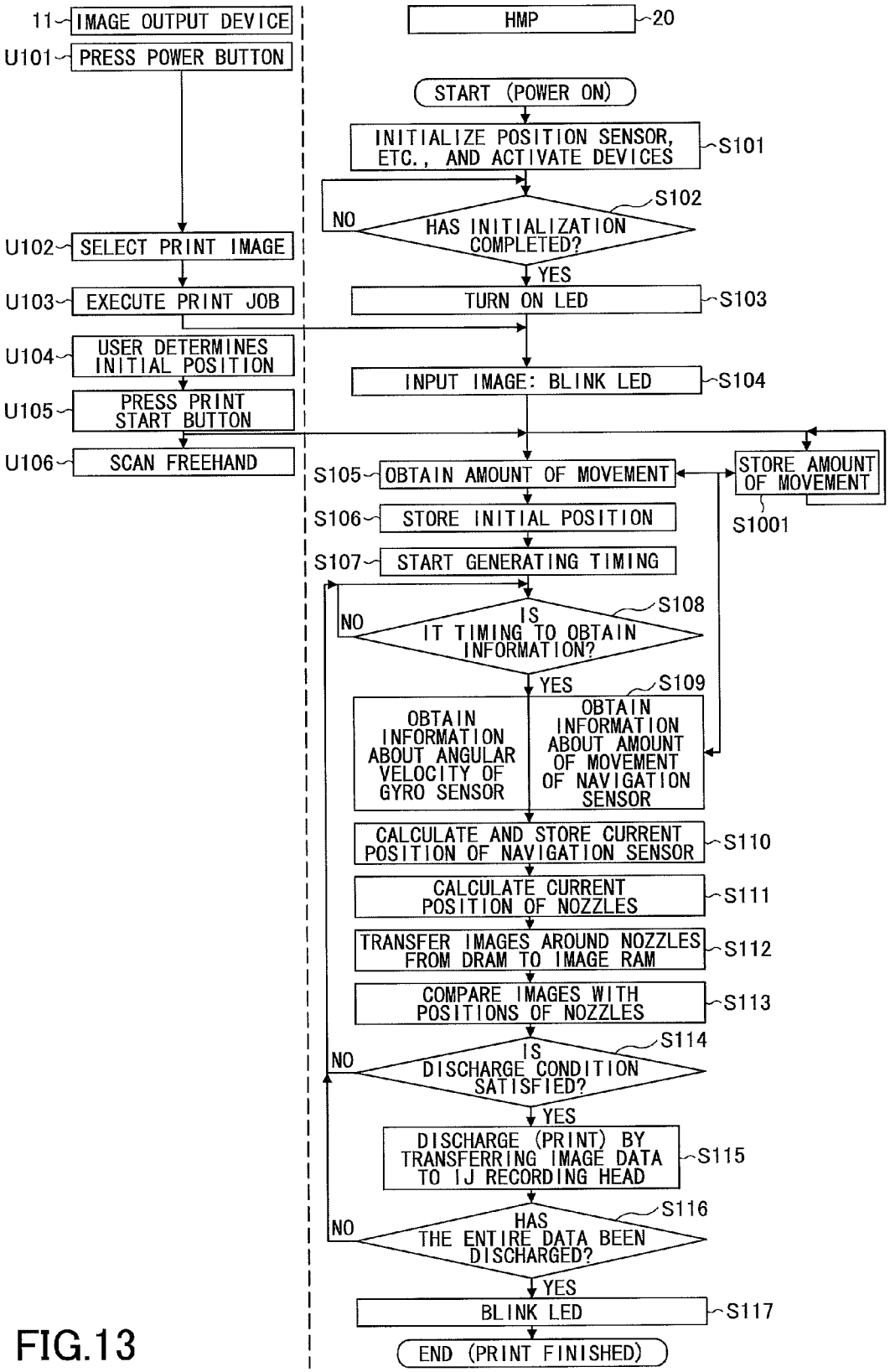
FIG. 13 is an example of a flowchart illustrating operational steps of an image data output device and an HMP.

FIG. 13 is an example of a flowchart illustrating operational steps of the image data output device 11 and the HMP 20. First, the user presses a power button of the image data output device 11 (Step U101). In response to the pressing operation, the image data output device 11 receives power supply from a battery or the like to be activated.

The user selects a desired image to be output on the image data output device 11 (Step U102). The image data output device 11 receives the selection of an image. Document data of software such as a word processor application may be selected as the image, or image data such as JPEG may be selected. The printer driver may change data other than image data into an image if necessary.

The user performs an operation to print the selected image by the HMP 20 (Step U103). The HMP 20 receives a request for executing the print job. In response to the request for the print job, the image data is transmitted to the HMP 20.

The user grips the HMP 20 and determines the initial position on the print medium 12 (for example, a notebook) (Step U104).

Then, the user presses a print start button of the HMP 20 (Step U105). The HMP 20 receives the press on the print start button.

The user makes scanning movement of the HMP 20 by freely sliding the HMP 20 on the print medium 12 (Step U106).

Next, operations of the HMP 20 will be described. The following operations are executed by the CPU 33 running the firmware.

The HMP 20 is also activated by the power turned on. The CPU 33 of the HMP 20 initializes the hardware elements in FIGS. 3 and 4 that are built in the HMP 20 (Step S101). For example, the CPU 33 initializes registers of the navigation sensor I/F 42 and the gyro sensor I/F 45, and sets a timing value in the print/sense timing generator 43. Also, the CPU 33 establishes communication between the HMP 20 and the image data output device 11.

The CPU 33 of the HMP 20 determines whether the initialization has been completed, and if not completed, repeats this determination (Step S102).

Once the initialization has been completed (YES at S102), the CPU 33 of the HMP 20 indicates to the user that the HMP 20 is in a state ready for printing, for example, by turning on the LED of the OPU 26 (Step S103). Thereby, the user grasps that the HMP 20 is in a state ready for printing, and makes the request for executing the print job as described above.

In response to the request for executing the print job, the communication I/F 27 of the HMP 20 receives image data input from the image data output device 11, and indicates to the user that the image has been input, for example, by blinking the LED of the OPU 26 (Step S104).

When the user has determined the initial position of the HMP 20 on the print medium 12 and has pressed the print start button, the OPU 26 of the HMP 20 receives this operation, and the CPU 33 makes the navigation sensor I/F 42 read the position (the amount of movement) (Step S105). Then, the navigation sensor I/F 42 communicates with the navigation sensor $S_0$, obtains the amount of movement detected by the navigation sensor $S_0$, and stores the amount in the register or the like (Step S1001). The CPU 33 reads out the amount of movement from the navigation sensor I/F 42.

The amount of movement obtained right after the user pressed the print start button is usually zero, and even if it is not actually zero, the CPU 33 stores the value, for example, in the DRAM 29 or registers of the CPU 33, as the initial position represented by the coordinates (0, 0) (Step S106).

Also, the print/sense timing generator 43 starts generating timing after having obtained the initial position (Step S107). When an obtaining timing of the amount of movement of the navigation sensor $S_0$ set by the initialization comes, the print/sense timing generator 43 indicates the timing to the gyro sensor I/F 45 and the navigation sensor I/F 42. This is performed periodically, which is the sampling cycle described above.

The CPU 33 of the HMP 20 determines whether it is a timing to obtain information about the amount of movement and the angular velocity (Step S108). This determination is performed in response to an indication from the interrupt controller 41, but the CPU 33 may count the time in the same way as the print/sense timing generator 43 so as to determine the timing by itself.

When the timing comes to obtain information about the amount of movement and the angular velocity, the CPU 33 of the HMP 20 obtains the amount of movement from the navigation sensor I/F 42 and obtains the angular velocity information from the gyro sensor I/F 45 (Step S109). As described above, the gyro sensor I/F 45 has obtained the angular velocity information from the gyro sensor 31 at the timing generated by the print/sense timing generator 43, and the navigation sensor I/F 42 has obtained the amount of movement from the navigation sensor $S_0$ at the timing generated by the print/sense timing generator 43.

Next, the position calculation circuit 34 calculates the current position of the navigation sensor $S_0$ by using the angular velocity information and the amount of movement (Step 5110). Specifically, the position calculation circuit 34 calculates the current position of the navigation sensor $S_0$ by adding the position (X, Y) calculated in the previous cycle, and the moved distance calculated from the amount of movement ($\Delta X'$, $\Delta Y'$) and the angular velocity information obtained this time. If only the initial position is available and there is no previously calculated position, the position calculation circuit 34 calculates the current position of the navigation sensor $S_0$ by adding the initial position, and the moved distance calculated from the amount of movement ($\Delta X'$, $\Delta Y'$) and the angular velocity information obtained this time.

Next, the position calculation circuit 34 calculates the current position of each of the nozzles 61 by using the current position of the navigation sensor $S_0$ (Step S111).

In this way, since the angular velocity information and the amount of movement are obtained by the print/sense timing generator 43 at virtually the same time, the positions of the nozzles 61 can be calculated by the angle of rotation and the amount of movement obtained at the timing when the angle of rotation has been detected. Therefore, the precision of the positions of the nozzles 61 is hard to decrease even if the positions of the nozzles 61 are calculated by the information obtained by different types of sensors.

Next, the CPU 33 controls the DMAC 38 and transmits image data of peripheral images around the nozzles 61 from the DRAM 29 to the Image RAM 37, based on the calculated positions of the nozzles 61 (Step S112). Note that the rotator 39 rotates the image depending on the head position specified by the user (the way of gripping the HMP 20, and the like) and the inclination of the IJ recording head 24.

Next, the IJ recording head controller 44 compares position coordinates of each pixel constituting the peripheral image with the position coordinates of the nozzles 61 (Step S113). The position calculation circuit 34 calculates the acceleration of the nozzles 61 by using the past positions and the current positions of the nozzles 61. This makes it possible for the position calculation circuit 34 to calculate the positions of the nozzles 61 every ink discharge cycle of the IJ recording head 24, which is shorter than the cycle for the navigation sensor I/F 42 to obtain the amount of movement and the cycle for the gyro sensor I/F 45 to obtain the angular velocity information.

The IJ recording head controller 44 determines whether the position coordinates of an image element is included in a predetermined range from the position of the nozzle 61 calculated by the position calculation circuit 34 (Step S114).

If the discharge condition is not satisfied, the process returns to Step S108. If the discharge condition is satisfied, the IJ recording head controller 44 outputs data of the image element for each of the nozzles 61 to the IJ recording head drive circuit 23 (Step S115). Thus, the ink is discharged onto the print medium 12.

Next, the CPU 33 determines whether the whole image data has been output (Step S116). If the whole image data has not been output, Steps S108 to S115 are repeated.

If the whole image data has been output, the CPU 33 indicates to the user that the printing has been completed, for example, by blinking the LED of the OPU 26 (Step S117).

Note that if the user judges that a sufficient image has been obtained without outputting the whole data, the user may press a print completion button, which is received by the OPU 26 to end printing. After having ended the printing, the user may turn off the power, or the power may be set turned off automatically when the printing has completed.

<Image Formable Area in Case of Single Navigation Sensor>

The image formable area 501 will be described in the case of the single navigation sensor 30 by using FIGS. 14A to 15F. FIGS. 14A-14F are examples of comparative diagrams illustrating the image formable areas 501 in the case of the two navigation sensors 30.

Figure 14A:
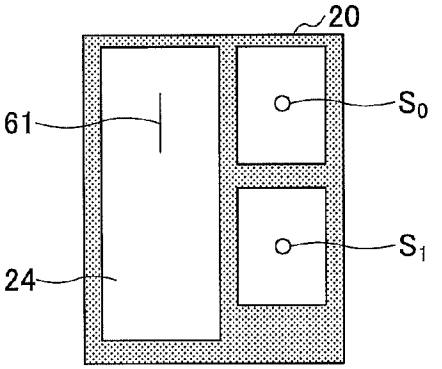
FIGS. 14A-14F are examples of comparative diagrams illustrating image formable areas in case of two navigation sensors.
Figure 14B:
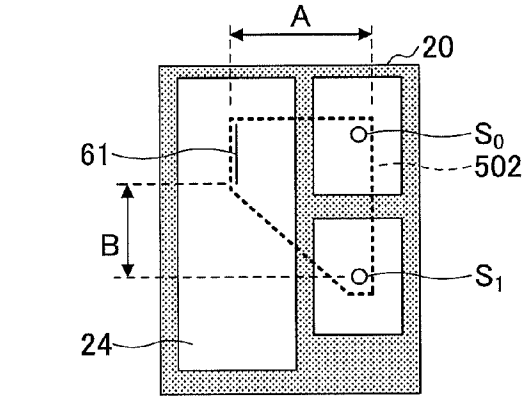

The two navigation sensors 30 are arranged in parallel with the nozzles 61 in FIG. 14A. Note that FIG. 14A is a diagram of the HMP 20 viewed from the upside. FIG. 14B illustrates a polygon 502 formed by parts (the navigation sensors $S_0$-$S_1$ and the nozzles 61) that have to be positioned on the print medium 12 with the arrangement in FIG. 14A. The polygon 502 is an example illustrating the size of the base. Assume that the interval between the nozzles 61 and the navigation sensors $S_0$-$S_1$ forming the polygon 502 is A mm, and the interval between the lower end of the nozzles 61 and the lower navigation sensor $S_1$ is B mm.

Figure 14C:
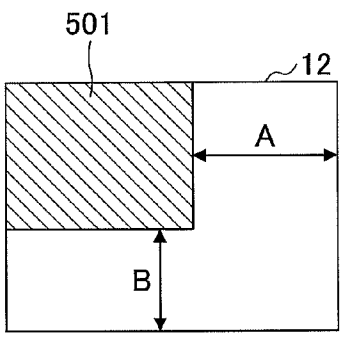

FIG. 14C illustrates the image formable area 501 for the arrangement in FIG. 14A. Since the nozzles 61 are positioned on the left end and on the upper end of the polygon 502, the nozzles 61 can form an image from the upper left end of the print medium 12. In contrast, since the nozzles 61 have the interval of A mm to the navigation sensors $S_0$-$S_1$ on the right side, the nozzles 61 cannot be moved in the right direction beyond the right end of the print medium 12 (cannot form an image). Therefore, the right end of the image formable area 501 is located on the line distant from the right end of the print medium 12 by the length A mm. Similarly, since the nozzles 61 has the interval of B mm to the lower navigation sensor $S_1$, the nozzles 61 cannot be moved in the lower direction beyond the lower end of the print medium 12 (cannot form an image). Therefore, the lower end of the image formable area 501 is located on the line distant from the lower end of the print medium 12 by the length B mm.

The two navigation sensors $S_0$-$S_1$ are arranged above and below the nozzles 61 in series in FIG. 14D. FIG. 14E illustrates a polygon 502 formed by parts (the navigation sensors $S_0$-$S_1$ and the nozzles 61) that have to be positioned on the print medium 12 with the arrangement in FIG. 14D. Assume that the interval between the navigation sensors $S_0$-$S_1$ forming the polygon 502 is A mm.

Figure 14D:
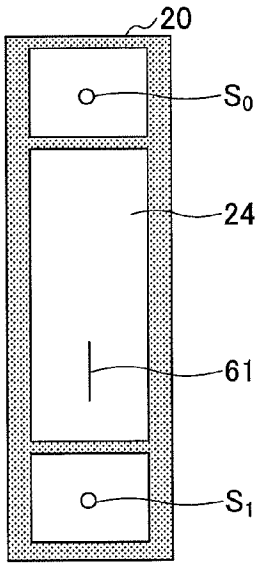
Figure 14E:
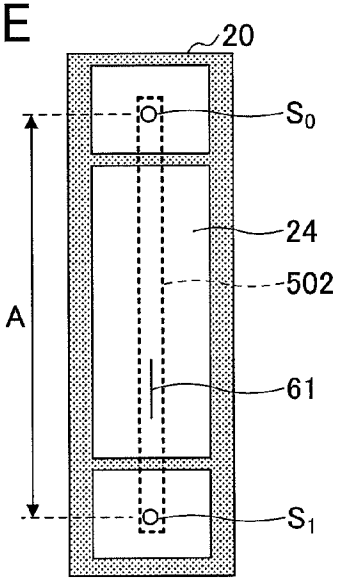
Figure 14F:
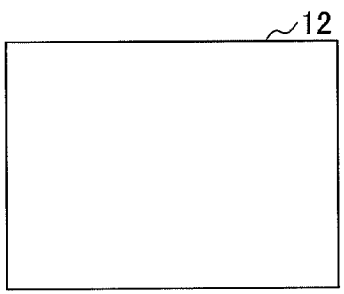

FIG. 14F illustrates the image formable area 501 for the arrangement in FIG. 14D. Since the vertical length of the print medium 12 is shorter than the length A mm, the HMP 20 cannot form an image on the print medium 12. Even if the HMP 20 is rotated by 90° so that the navigation sensors $S_0$-$S_1$ are arranged in parallel with the lateral direction of the print medium 12, the HMP 20 cannot form an image on the print medium 12 because the lateral length of the print medium 12 is shorter than the length A mm. Therefore, there is no image formable area 501 in FIG. 14F.

In this way, if at least one of the two navigation sensors 30 sticks out of the print medium 12, the HMP 20 cannot detect the position or may detect the position but not precisely. As such, a large size of the base part of the HMP has brought inconvenience that limits the image formable area 501 on the print medium 12. Also, even if the two navigation sensors 30 are on the print medium 12, the HMP 20 cannot form an image when the IJ recording head 24 goes out of the print medium 12, naturally. Therefore, the two navigation sensors 30 and the IJ recording head 24 need to be positioned inside of the print medium 12, and the image formable area 501 is limited accordingly. Therefore, it might be difficult for the user to use the space on the print medium 12 widely for forming an image with a conventional HMP 20.

Figure 15E:
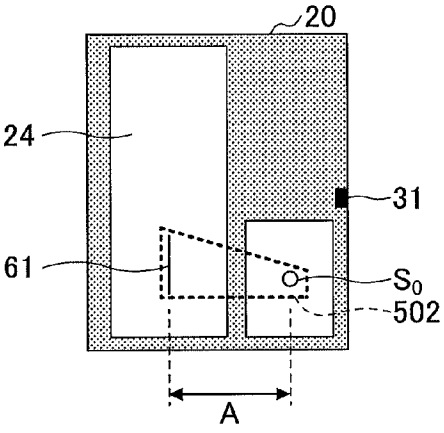
FIGS. 15A-15F are examples of diagrams illustrating image formable areas in case of one navigation sensor.
Figure 15F:
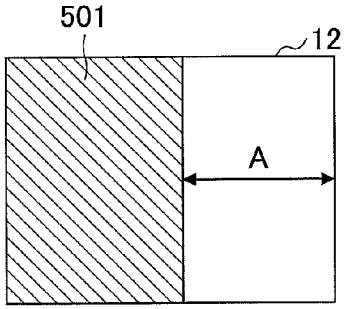
Figure 15C:
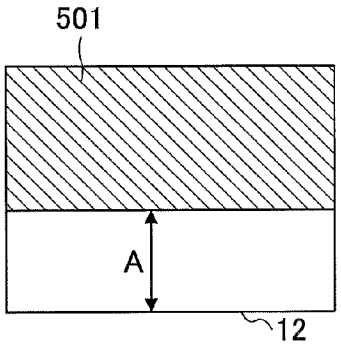
Figure 15D:
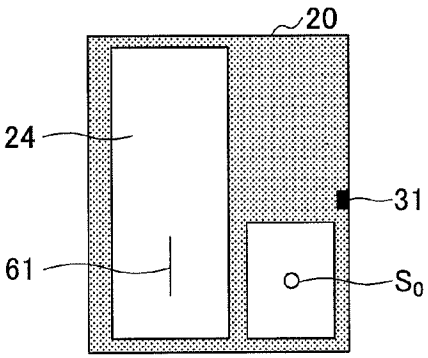
Figure 15A:
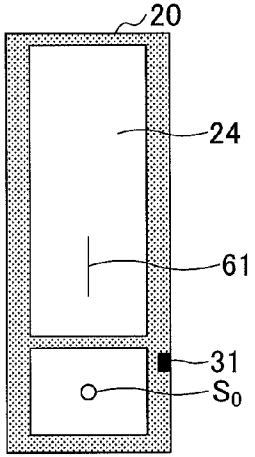
Figure 15B:
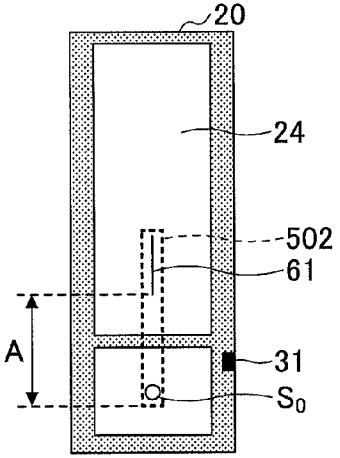

FIGS. 15A-15F are examples of diagrams illustrating image formable areas 501 in the case of one navigation sensor 30. One navigation sensor 30 is arranged in series with the nozzles 61 in FIG. 15A. In other words, the navigation sensor $S_0$ is placed adjacent to, and below the nozzles will 61 as close as possible. Note that FIG. 15A is a diagram of the HMP 20 viewed from the upside. FIG. 15B illustrates a polygon 502 formed by parts (the navigation sensor $S_0$ and the nozzles 61) that have to be positioned on the print medium 12 with the arrangement in FIG. 15A. Assume that the distance between the lower end of the nozzles 61 and the navigation sensor $S_0$ forming the polygon 502 is A mm.

FIG. 15C illustrates the image formable area 501 for the arrangement in FIG. 15A. Since the polygon 502 has almost a linear shape, an image can be formed from the upper end of the left edge of the print medium 12 to the upper end of the right end of the print medium 12. However, since the nozzles 61 has the interval of A mm to the navigation sensor $S_0$ below, the nozzles 61 cannot be moved in the lower direction beyond the lower end of the print medium 12 (cannot form an image). Therefore, the lower end of the image formable area 501 is located on the line distant from the lower end of the print medium 12 by the length A mm.

As is obvious by comparing FIGS. 14C and 14F with FIG. 15C, providing just one navigation sensor 30 greatly expands the image formable area 501. Especially, since the top half and more of the print medium 12 become the image formable area 105, if the HMP 20 is rotated by 180°, the bottom half of the print media 12 also becomes the image formable area 501. Therefore, the entire area of the print medium 12 virtually becomes the image formable area 501.

Note that the navigation sensor $S_0$ may be arranged above the IJ recording head 24 in FIG. 15A. In this case, the upper end of the image formable area 501 is located on the line distant from the upper end of the print medium 12 by the length A mm (the image formable area 501 in FIG. 15C turned upside down).

In FIG. 15D, one navigation sensor $S_0$ is arranged in the direction perpendicular to the direction of the arrayed nozzles 61. In other words, the navigation sensor $S_0$ is placed adjacent to the right side of the nozzle 61 and close as much as possible. FIG. 15E illustrates a polygon 502 formed by parts (the navigation sensor $S_0$ and the nozzles 61) that have to be positioned on the print medium 12 with the arrangement in FIG. 15D. Assume that the distance between the nozzles 61 and the navigation sensor $S_0$ forming the polygon 502 is A mm.

FIG. 15F illustrates the image formable area 501 for the arrangement in FIG. 15D. Since the nozzles 61 are at the upper end and the left end of the polygon 502, and do not have the navigation sensor $S_0$ below, an image can be formed from the upper end to the lower end on the left side of the print medium 12. However, since the nozzles 61 have the interval of A mm to the navigation sensors $S_0$ on the right, the nozzles 61 cannot be moved in the right direction beyond the right end of the print medium 12 (cannot form an image). Therefore, the right end of the image formable area 501 is located on the line distant from the right end of the print medium 12 by the length A mm.

As is obvious by comparing FIGS. 14C and 14F with FIG. 15F, providing just one navigation sensor 30 greatly expands the image formable area 501. Especially, since the left half and more of the print medium 12 become the image formable area 105, if the HMP 20 is rotated by 180°, the right half of the print media 12 also becomes the image formable area 501. Therefore, the entire area of the print medium 12 virtually becomes the image formable area 501. Note that the navigation sensor $S_0$ may be arranged on the left of the IJ recording head 24 in FIG. 15D. In this case, the left end of the image formable area 501 is located on the line distant from the left end of the print medium 12 by the length A mm (the image formable area 501 in FIG. 15F flipped horizontally).

Figure 16:
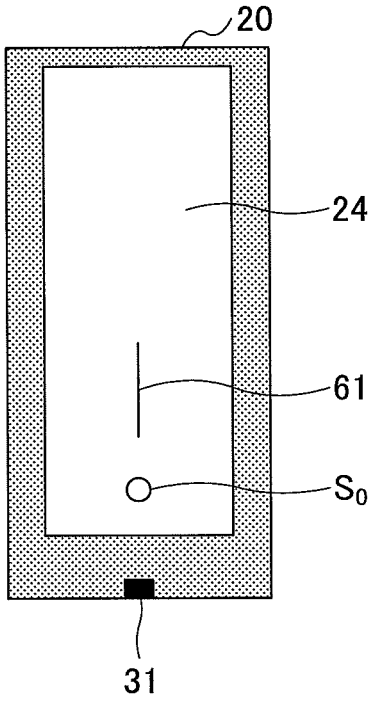
FIG. 16 is an example of a diagram illustrating an arrangement of a navigation sensor.

Also, as illustrated in FIG. 16, the navigation sensor $S_0$ may be mounted on the IJ recording head 24. FIG. 16 is an example of a diagram illustrating an arrangement of the navigation sensor $S_0$. The navigation sensor $S_0$ is mounted, for example, in a hole prepared in a bracket (a holding member) surrounding the nozzles 61. Alternatively, if the navigation sensor $S_0$ does not need to be placed around the base, the navigation sensor $S_0$ may be mounted inside of the housing rather than on the base surface. In this case, since the navigation sensor $S_0$ and the nozzles 61 do not need to be mounted on the same surface, the interval between the navigation sensor $S_0$ and the nozzles 61 can be shortened.

<Example of Arrangement of Gyro Sensor 31>

It has been known that the gyro sensor 31 is preferably placed close to the rotational center. However, it is often the case that the rotational center of the HMP 20 is located around the elbow of the user rather than at the center or the center of gravity of the HMP 20. This is because the user performs a scanning operation of the HMP by using the elbow as the rotational center. Thereupon, the gyro sensor 31 is preferably placed as illustrated in FIGS. 17A-17C.

Figure 17A:
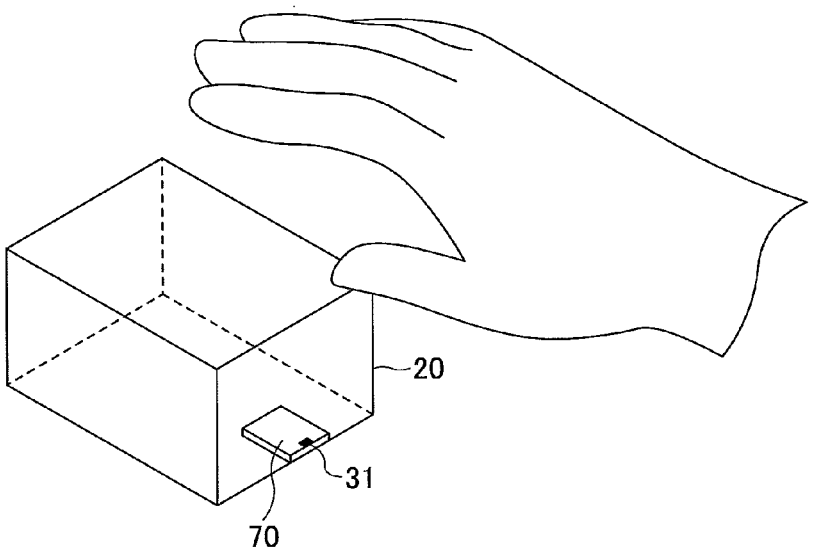
FIGS. 17A-17C are examples of diagrams illustrating arrangements of a gyro sensor.
Figure 17B:
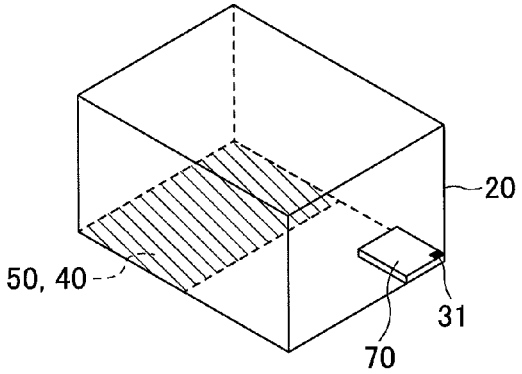
Figure 17C:
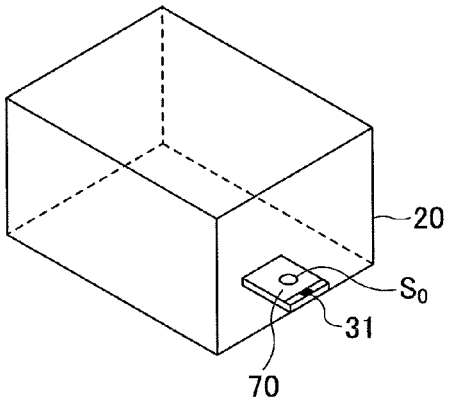

FIG. 17A is an example of a diagram illustrating an arrangement of the gyro sensor 31. The gyro sensor 31 is placed on the near side of the housing and at the center in the width direction of the HMP 20. This is because the location is the closest to the user's elbow. In this placement, the gyro sensor 31 is placed close to the rotational center, and hence, it is expected that precision of the angular velocity to be detected will increase. Note that the user may perform a scanning operation with the HMP 20 in a state rotated 90° or 180°. Taking this point into consideration, it is preferable that one or more gyro sensors 31 are disposed on the edge of the HMP 20 in a plan view from the upper side of the HMP 20.

On the other hand, if assuming that the HMP 20 is a rigid body, the gyro sensor 31 is not necessarily limited to be placed on the near side of the housing, but may be placed anywhere on the HMP 20 to obtain practically sufficient precision. However, the neighborhood of a part of the HMP 20 that may be touched by the user may receive force to deform when the user performs a scanning operation with the HMP 20. If such deformation is transferred to the gyro sensor 31, noise may be mixed into the angular velocity.

Therefore, it is preferable that the gyro sensor 31 is placed inside of the HMP 20 in a state hard to be touched by the user and hard to be deformed easily. Specifically, the gyro sensor 31 is mounted on a printed circuit board 70 near the base of HMP 20. Note that the printed circuit board 70 is a planner shaped part made of resin or the like, to have electronic components, integrated circuits (ICs), and metal wiring connecting the components mounted in high density. A printed board may be called a PWB (printed wiring board) or an electronic board. By having the gyro sensor 31 placed in this way, even if the HMP 20 deforms by force of an ordinary person, the deformation is hard to transfer to the gyro sensor 31, and hence, it is possible to prevent noise from mixing into the angular velocity.

Also, it has been known that the angular velocity of the gyro sensor 31 is affected by a change of the temperature. Therefore, it is the preferably placed in a place where the temperature does not change much in the housing. Circuits in which much current flows, such as a power supply or an LSI, for example, the SoC and the ASIC/FPGA, are heating elements that generate heat during operation. Therefore, the temperature changes much in the neighborhood of these circuits. Therefore it is preferable that the gyro sensor 31 is placed away from the SoC 50 and the ASIC/FPGA 40 as much as possible as illustrated in FIG. 17B. In FIG. 17B, the gyro sensor 31 is mounted on the printed circuit board 70 which is different from the SoC 50 and the ASIC/FPGA 40, to say the least.

Note that a person's hand also serves as a heat source. In this regard also, it is preferable that the gyro sensor 31 is placed near the base surface.

Also, if the temperature characteristic is linear or can be investigated in advance, the temperature may be measured by a temperature sensor so as to correct the angular velocity depending on the temperature characteristic.

It is also effective to mount the navigation sensor $S_0$ and the gyro sensor 31 on the same printed circuit board 70. In FIG. 17C, the gyro sensor 31 and the navigation sensor $S_0$ are mounted on the single printed circuit board 70 placed on the near side of the HMP 20. Having the gyro sensor 31 and the navigation sensor $S_0$ positioned close to each other does not necessarily contribute to reducing the size of the base surface of the HMP 20. However, if the gyro sensor 31 is triaxial, such placement has advantages described below because it is possible to detect a change of the posture other than the angular velocity with respect to the axis perpendicular to the print medium 12.

Figure 18:
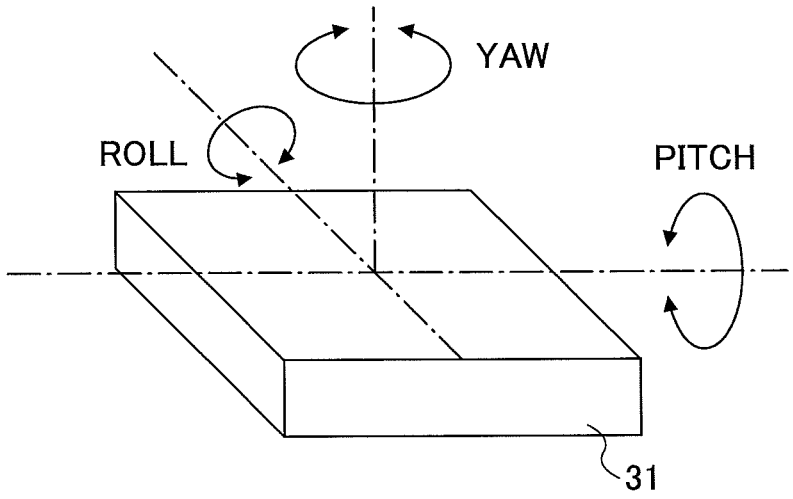
FIG. 18 is an example of a diagram illustrating a posture of an HMP detected by a gyro sensor.

FIG. 18 is an example of a diagram illustrating a posture of the HMP 20 detected by a gyro sensor. If the gyro sensor 31 is triaxial, the angular velocity can be detected in the yaw direction, the roll direction, and the pitch direction. Among these, the angular velocity in the yaw direction is used for calculating the position of the navigation sensor. If the angular velocity is detected in the roll direction and the pitch direction while forming an image, the navigation sensor 30 may be detached from the print medium 12. If the navigation sensor $S_0$ and the gyro sensor 31 are mounted on the same printed circuit board 70, it can be considered that substantially the same angular velocity as the angular velocity in the roll direction and the pitch direction detected by the gyro sensor 31 acts upon the navigation sensor $S_0$. Therefore, it may be easy to detect the angular velocity generated in the roll direction and the pitch direction to the extent that the navigation sensor $S_0$ is detached from the print medium 12.

Therefore, if the navigation sensor $S_0$ and the gyro sensor 31 are mounted on the same printed circuit board 70, using the triaxial gyro sensor 31 makes easier to detect whether the navigation sensor $S_0$ is detached from the print medium 12.

<The Treatment at the Time of Attachment of the Gyro Sensor 31>

Also, if the gyro sensor 31 can detect the angular velocity triaxially, the HMP 20 and the like can detect attachment precision when the gyro sensor 31 has been attached to the HMP 20. It is preferable that the gyro sensor 31 is attached to be level with the HMP 20 as precisely as possible. If that is the case, a change of the posture of the HMP 20 in the yaw direction can be detected by only the angular velocity in the yaw direction. However, the level may be slightly shifted in the actual attachment. In such a case, even if the user rotates the HMP 20 while keeping the horizontal level, the angular velocity may be detected in the role direction or the pitch direction.

To cope with this problem, the user may operate the HMP 20 in a test mode or the like, and performs a scanning operation with the HMP 20 while keeping the horizontal level. The HMP 20 may detect the angular velocity in the roller direction or the pitch direction, and determines how much the gyro sensor 31 inclines with respect to the HMP 20. Once the degree of the inclination becomes known, it is possible to correct the angular velocity in the yaw direction.

Also, if the gyro sensor 31 is to detect the angular velocity just monoaxially (only in the yaw direction), a jig may be provided that can make movement starting from 0°, shifting to 90°, and returning to the 0°. While the user moves the jig starting from 0°, shifting to 90°, and returning to the 0°, the HMP 20 detects the angle. If the detected angle does not match the 90° during the movement, the HMP 20 calculates a correction coefficient to make the detected angle match 90°, and stores the coefficient in the device. Using this coefficient, the angular velocity can be corrected during an actual image formation operation.

Second Application Example

When the user performs the scanning operation with the HMP 20 on the print medium 12, the base of the HMP 20 may slightly float over the print medium 12. In such a case, the navigation sensor 30 also floats, and hence, a position detected by the navigation sensor 30 becomes imprecise. An error of the position due to the floating may be negligible by itself, but the resolution of the amount of movement changes a lot.

The optical resolution of the navigation sensor 30 may be represented by CPI (Count Per Inch). This represents a number counted while the navigation sensor 30 moves by 1 inch, and the greater the number is, the higher the resolution is.

Figure 19:
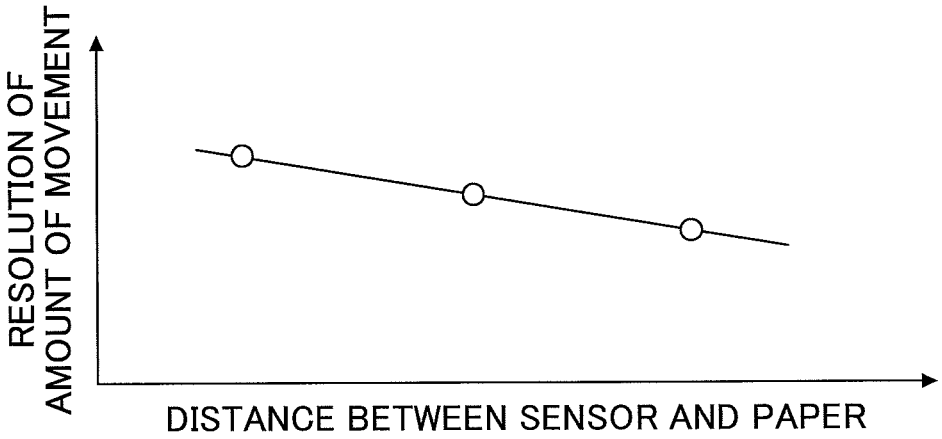
FIG. 19 is an example of a diagram illustrating change of the distance between a sensor and a sheet, and the resolution of the amount of movement.

As illustrated in FIG. 19, the resolution of the amount of movement of the navigation sensor 30 changes depending on the distance between the surface of paper and the navigation sensor 30. FIG. 19 is an example of a diagram illustrating change of the distance between the navigation sensor 30 and the sheet, and the resolution of the amount of movement. It can be understood the greater the distance between the sensor and the paper becomes, the lower the resolution becomes. This is because the navigation sensor 30 optically detects edges on the print medium 12, and hence, a closer distance between the sensor and the paper is more advantageous for detecting the edges (easier to detect finer edges).

Considering such a property of the navigation sensor 30, a maker of the HMP 20 sets the resolution in advance for detecting the amount of movement in the X and Y directions in accordance with the attached position of the navigation sensor 30 in the HMP 20.

Therefore, if the HMP 20 floats over the print medium 12, the measured amount of movement may deviate to be detected as a fewer amount of movement than the actual amount of movement, and hence, it is preferable to correct the deviation in a certain way. The present application example will describe an HMP 20 that prevents the resolution of the amount of movement from being reduced when the HMP 20 floats over the print medium 12.

Figure 20A:
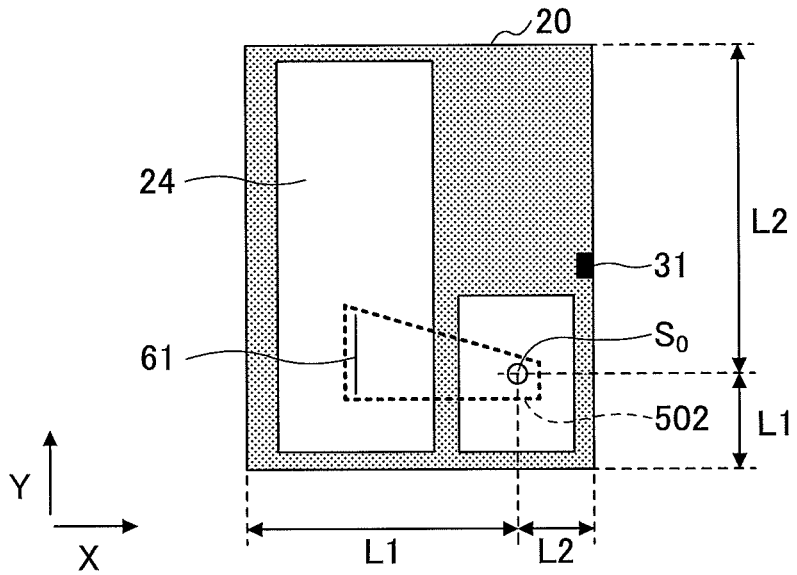
FIGS. 20A-20B are examples of diagrams illustrating an attached position of a navigation sensor.
Figure 20B:
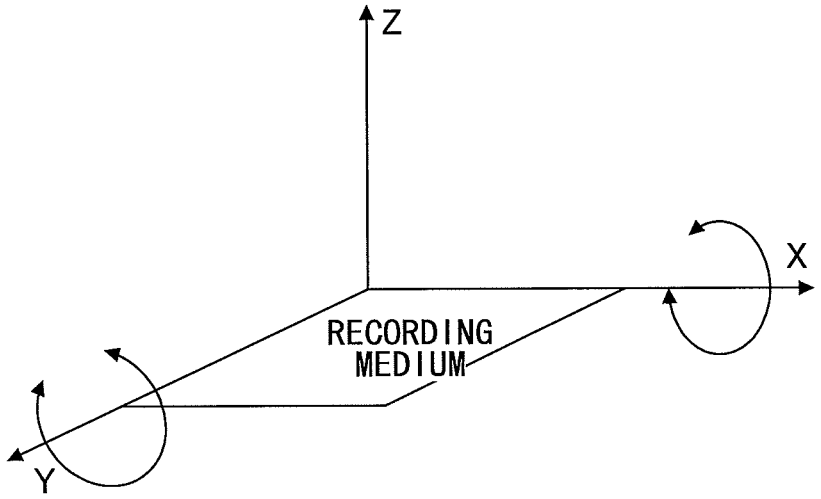

FIG. 20A is a diagram illustrating an attached position of the navigation sensor 30 viewed from the upper side of the HMP 20, and FIG. 20B is a diagram illustrating triaxial rotation of the navigation sensor 30.

As illustrated in FIG. 20B, the print medium 12 is laid on the X-Y plane, and the Z-axis is taken in the direction perpendicular to the print medium 12. As described in the application example 1, the positions of the nozzles 61 are calculated by the angle of rotation around the Z-axis. On the other hand, how much the navigation sensor 30 floats over the print medium 12 is affected by at least one of the angle of rotation around the X-axis and the angle of rotation around the Y-axis. Note that it is not necessary to care about translation of the entire navigation sensor 30 in the Z-axis direction. This is because it is unlikely that the user uses the HMP 20 in such a way, and if the entire navigation sensor 30 floats too much, it may be recognized as an error.

Assuming that the angle of rotation is zero both around the X-axis and around the Y-axis when printing is started, if the gyro sensor 31 detects a nonzero angle of rotation around the X-axis (the Y-Z plane) or a nonzero angle of rotation around the Y-axis (the X-Z plane), the position calculation circuit 34 can detect that the navigation sensor 30 is floating over the print medium 12 during the scanning for printing.

Figure 21A:
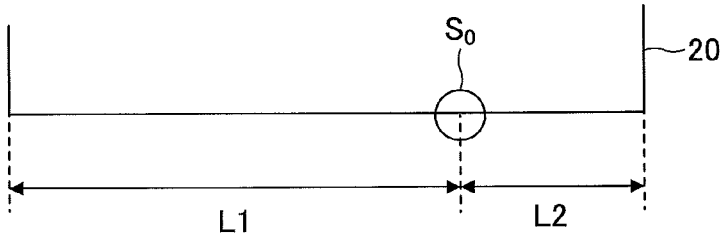
FIGS. 21A-21C are examples of diagrams illustrating the amount of floating of a navigation sensor over a print medium.
Figure 21B:
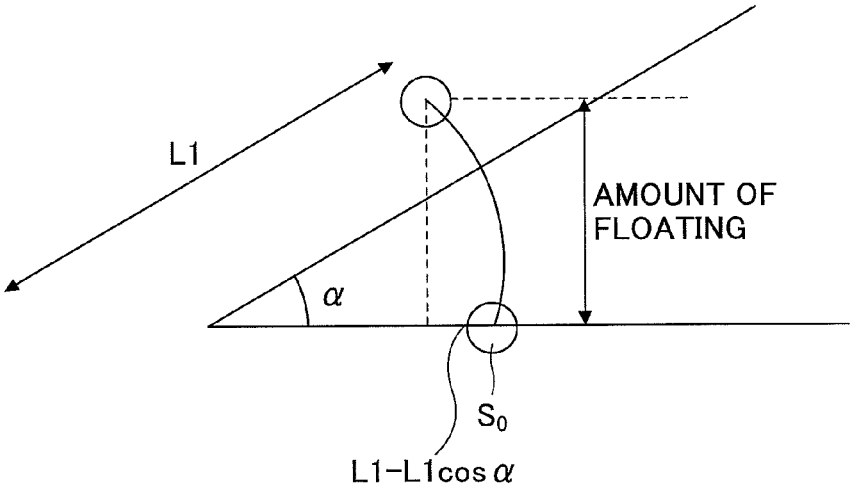
Figure 21C:
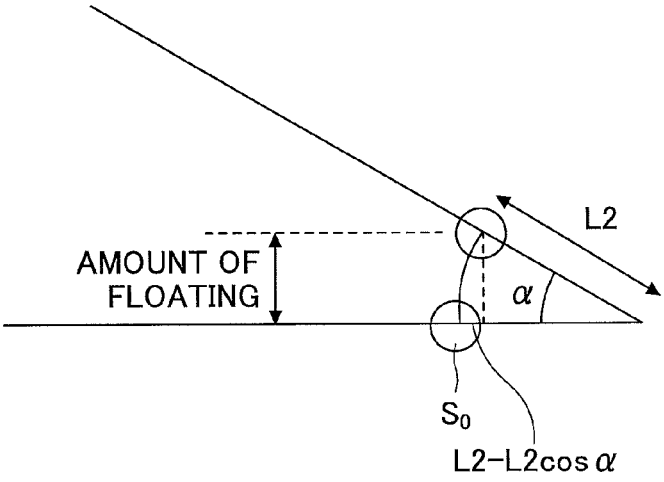

Next, a method for calculating the amount of floating will be described with reference to FIGS. 21A-210. FIGS. 21A-210 are examples of diagrams illustrating the amount of floating of the navigation sensor 30 over the print medium 12. FIG. 21A is a side view of the navigation sensor 30 viewed in the Y-axis direction in FIG. 20A. FIG. 21B illustrates the amount of floating of the navigation sensor 30 when rotating (floating) around its left edge as the rotational axis, and FIG. 21C illustrates the amount of floating of the navigation sensor 30 when rotating (floating) around its right edge as the rotational axis.

Here, L1 represents the distance between the navigation sensor 30 and the left edge of the housing of the HMP 20, and L2 represents the distance between the navigation sensor 30 and the right edge. Since the rotational direction around the Y-axis flips between rotation around the left edge and rotation around the right edge, the position calculation circuit 34 can determine the rotational direction (rotation around the left edge or rotation around the right edge) whether the angle of rotation is positive or negative. The position calculation circuit 34 calculates the amount of floating as illustrated in FIG. 21B for the rotation around the left edge, or calculates the amount of floating as illustrated in FIG. 21C for the rotation around the right edge.

Here, $\alpha$ represents the angle of rotation detected by the gyro sensor 31. Once the rotational direction has been determined, just the absolute value of a may be taken care of The absolute value may be sufficient as a after the rotational direction was judged. The amount of floating for the rotation around the left edge based on FIG. 21B is represented as follows.

L1 sin $\alpha$

Similarly, the amount of floating for the rotation around the right edge based on FIG. 21C is represented as follows.

L2 sin $\alpha$

The amount of floating as illustrated in FIGS. 21A-213 is generated by rotation around the Y-axis. In addition, the HMP 20 may be rotated around the X-axis. Therefore, the position calculation circuit 34 also calculates the amount of floating generated by rotation around the X-axis. Thus, the overall amount of floating is calculated by the following formula as the sum of the amount of floating by rotation around the X-axis and the amount of floating by rotation around the Y-axis.

Amount of floating of the navigation sensor 30=
(amount of floating by rotation around X-axis)+
(amount of floating by rotation around Y-axis)

Note that the navigation sensor 30 that is floating may have moved not only in the height direction of the navigation sensor 30, but also in the lateral direction. The amount of movement is represented by "L1-L1 cos $\alpha$" or "L2-L2 cos $\alpha$". However, since the amount of floating is small in an actual scanning operation of the HMP 20, the amount itself may be negligible.

However, a decreased resolution of the amount of movement, which is caused by a changed distance between the navigation sensor 30 and the print medium 12 due to the floating as described above, cannot be disregarded. Since even if the navigation sensor 30 floats just slightly during a scanning operation, the resolution of the amount of movement output by the navigation sensor 30 changes (decreases) considerably such that the detected amount of movement is smaller than the actual amount of movement of the navigation sensor 30.

Thereupon, by using the proportional relationship between the distance between the sensor and the paper, and the amount of movement illustrated in FIG. 19, the position calculation circuit 34 converts the amount of floating into the change of the resolution, to correct the amount of movement. The correction will be described with a specific example.

Assume that the relationship between the distance between the sensor and the paper, and the amount of movement of the navigation sensor 30 is, for example, as follows:

resolution worth 4000 cpi if the distance between the sensor and the paper is 2 mm; and resolution worth 3500 cpi if the distance between the sensor and the paper is 2.1 mm.

In other words, if the amount of floating changes from 2 mm to 2.1 mm, the resolution of the amount of movement decreases by 500 cpi. This means that the amount of movement output by the navigation sensor 30 is 157 counts for the navigation sensor 30 having moved by 1 mm when the distance between the print medium and the sensor is 2 mm, whereas the amount of movement output by the navigation sensor 30 decreases to 137 counts for the navigation sensor 30 having moved by 1 mm when the distance between the print medium and the sensor is changed to 2.1 mm. Thus, the calculated amount of movement is less than the actual amount of movement, and hence, the calculated position of the navigation sensor 30 is shifted from the actual position.

However, by having the HMP 20 store the proportional relationship between the distance between the sensor and the paper, and the resolution of the amount of movement as illustrated in FIG. 19, the position calculation circuit 34 can estimate the resolution of the amount of movement from the amount of floating, to correct the position.

For example, the proportional relationship between the distance between the sensor and the paper, and the resolution of the amount of movement may be represented by an expression y=ax+b, where y represents the resolution of the amount of movement, x represents the distance between the sensor and the paper, and a and b are coefficients. The resolution of the amount of movement can be calculated from the amount of floating represented by x. First, divide the resolution of the amount of movement when the amount of floating is zero, by the calculated resolution of the amount of movement, and then, multiply the quotient by the amount of movement (counts) detected for the floating navigation sensor 30. In this way, even if the navigation sensor 30 floats, the amount of movement can be corrected to a value to be obtained with the amount of floating being zero.

Note that since the proportional relationship of the resolution of the distance between the sensor and the paper, and the amount of movement may change depending on the type of paper, it is preferable to hold the proportional relationship of the resolution of the distance between the sensor and the paper for each of the types of paper.

Figure 22:
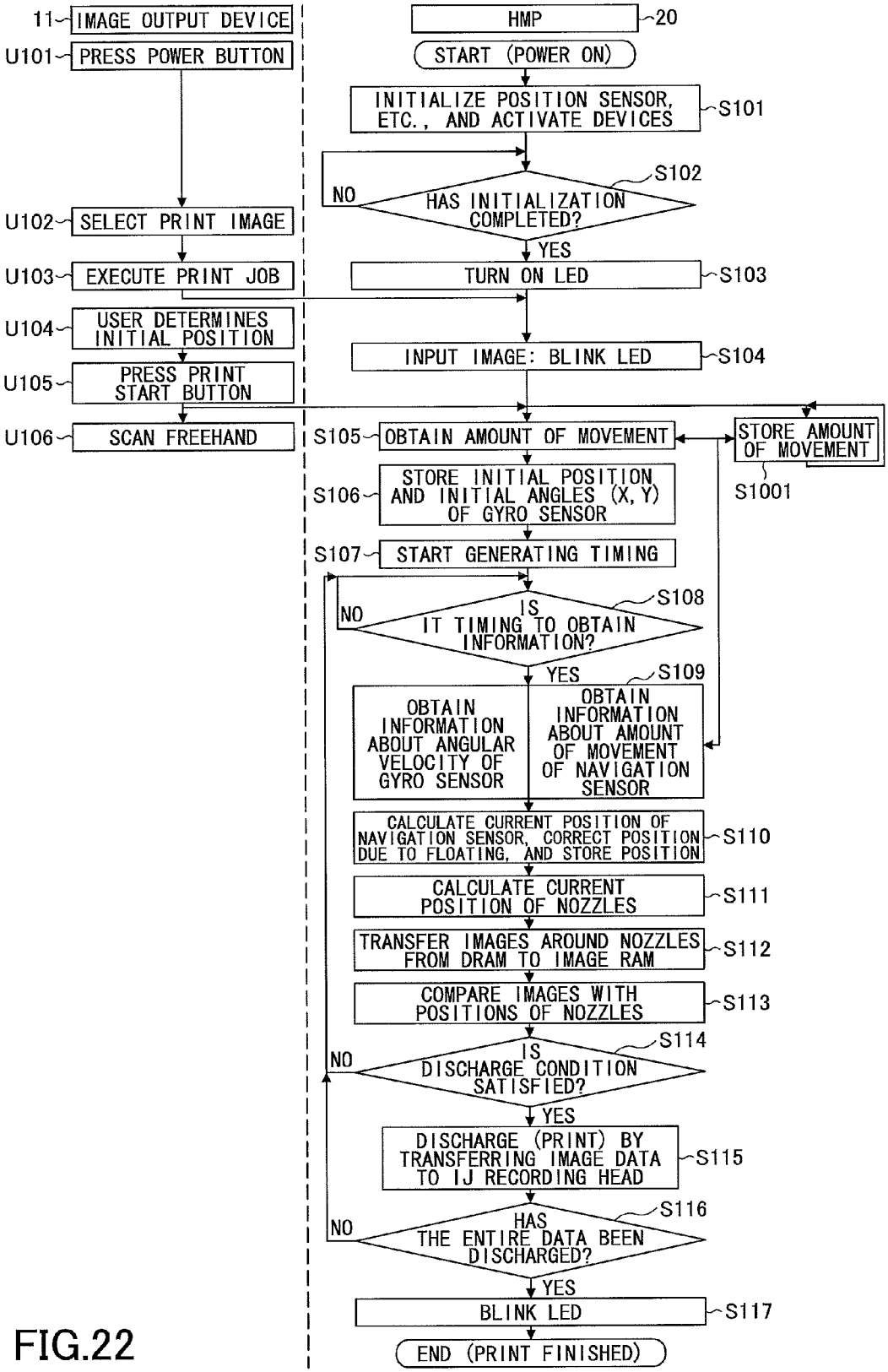
FIG. 22 is an example of a flowchart illustrating operational steps of an image data output device and an HMP (second application example).

FIG. 22 is an example of a flowchart illustrating operational steps of the image data output device 11 and the HMP 20. FIG. 22 will be described mainly in terms of differences with FIG. 13.

As the first difference, at Step S106, the CPU 33 stores the initial angle (X, Y) of the gyro sensor 31 along with the initial position represented by the coordinates (0, 0) in the DRAM 29 or the registers of the CPU 33 (Step S106). In other words, the CPU 33 reads the angular velocity information of the gyro sensor 31.

Then, at Step S110, when calculating the current position of the navigation sensor $S_0$ by using the angular velocity information and the amount of movement, the position calculation circuit 34 calculates the amount of floating based on the angles of rotation around the X-axis and around the Y-axis detected by the gyro sensor 31, to correct the position of navigation sensor 30.

As described above, according to the present application example, even if the resolution of the amount of movement changes due to the floating navigation sensor 30, the position of the navigation sensor 30 can be corrected.

Other Application Examples

As above, most preferable embodiments have been described with the application examples. Note that the present invention is not limited to these embodiments and application examples, but various variations and modifications may be made without departing from the scope of the present invention.

For example, elements in the SoC 50 and the ASIC/FPGA 40 may be included in either of the SoC 50 or the ASIC/FPGA 40 depending on the CPU performance, the circuit size of the ASIC/FPGA 40, and the like. Also, although the embodiments describe image forming in terms of discharging ink, image forming may be done with emitting visible light rays, ultraviolet rays, infrared rays, laser beams, and the like. In this case, for example, a material that reacts to heat or light may be used as the print medium 12. Also, transparent liquid may be discharged. In this case, visible information may be obtained if emitting light in a specific range of wavelengths. Also, metallic paste or resin may be discharged.

Also, although the embodiments described that the gyro sensor 31 detects the posture on the print medium 12, the posture (orientation) in the horizontal direction can be detected by a geomagnetic sensor.

Also, the number of the gyro sensors 31 to be disposed is not limited to one but may be two or more.

Note that the navigation sensor $S_0$ is an example of a moved amount detector, the gyro sensor 31 is an example of a posture detector, and the position calculation circuit 34 is an example of a position calculator. The print/sense timing generator 43 is the examples of a timing indicator, the IJ recording head controller 44 is an example of a droplet discharger, and the HMP 20 is an example of a droplet discharging apparatus. The CPU 33, the position calculation circuit 34, and the gyro sensor 31 are an example of a floating amount calculator.

Also, an apparatus that has functions minimally required for calculating the position of the HMP 20 is a position detection apparatus. For example, a position detection apparatus includes the navigation sensor $S_0$, the gyro sensor 31, the position calculation circuit 34, and the CPU 33. In other words, an HMP 20 that does not include functions required for image forming is a position detection apparatus. Also, an apparatus having a position detection apparatus is a mounted object, and the HMP 20 is an example of the mounted object.

RELATED-ART DOCUMENTS

Patent Documents

[Patent Document 1] Japanese Unexamined Patent Application Publication (Translation of PCT Application) No. 2010-522650

The present application claims priority under 35 U.S.C. § 119 of Japanese Patent Application No. 2016-053538 filed on Mar. 17, 2016, and Japanese Patent Application No. 2016-251726 filed on Dec. 26, 2016, the entire contents of which are hereby incorporated by reference.

What is claimed is:

1. A position detection apparatus configured to detect a position on a movement surface of a mounted object having the position detection apparatus mounted thereon, the position detection apparatus comprising:

a moved amount detector configured to detect an amount of movement of the mounted object on the movement surface;

a posture detector configured to detect at least a posture of the mounted object on the movement surface;

a position calculator connected to the moved amount detector and the posture detector, and configured to calculate the position of the mounted object, based on the amount of movement and the posture; and a timing indicator configured to indicate timing to the moved amount detector and the posture detector, wherein the timing indicator indicates the timing to detect the posture to the posture detector at the same timing as timing at which the moved amount detector detects the amount of movement.

2. A position detection apparatus configured to detect a position on a movement surface of a mounted object having the position detection apparatus mounted thereon, the position detection apparatus comprising:

a moved amount detector configured to detect an amount of movement of the mounted object on the movement surface;

a posture detector configured to detect at least a posture of the mounted object on the movement surface;

a position calculator connected to the moved amount detector and the posture detector, and configured to calculate the position of the mounted object, based on the amount of movement and the posture; and a floating amount calculator configured to calculate an amount of floating of the mounted object over the movement surface, based on the posture of the mounted object detected by the posture detector, wherein the position calculator corrects the amount of movement detected by the moved amount detector depending on the amount of floating calculated by the floating amount calculator.

3. A droplet discharging apparatus comprising:

a position detection apparatus configured to detect a position on a movement surface of a mounted object having the position detection apparatus mounted thereon, the position detection apparatus comprising:

a moved amount detector configured to detect an amount of movement of the mounted object on the movement surface;

a posture detector configured to detect, *from an angular velocity caused by the movement of the mounted object,* at least a posture of the mounted object on the movement surface; and a position calculator connected to the moved amount detector and the posture detector, and configured to calculate the position of the mounted object, based on the amount of movement and the posture; and a droplet discharger connected to the position detection apparatus and configured to discharge a liquid droplet for forming an image at the position depending on the position of the mounted object.

4. The droplet discharging apparatus according to claim 3, wherein the moved amount detector and the droplet discharger are arranged adjacent to each other.

5. The droplet discharging apparatus according to claim 3, wherein the droplet discharger has a plurality of droplet discharging parts arranged in a row, wherein the moved amount detector is arranged in a direction perpendicular to the row of the droplet discharging parts.

6. The droplet discharging apparatus according to claim 3, wherein the droplet discharger has a plurality of droplet discharging parts arranged in a row, wherein the moved amount detector is arranged in series with the row of the droplet discharging parts.

7. The droplet discharging apparatus according to claim 3, wherein the droplet discharging apparatus comprises a housing to which the posture detector is mounted, and the posture detector is mounted at a center position between two walls of the housing.

8. A method of detecting a position on a movement surface of a mounted object, the method comprising:

detecting an amount of movement of the mounted object on the movement surface;

detecting, *from an angular velocity caused by the movement of the mounted object,* at least a posture of the mounted object on the movement surface; *wherein the detected angular velocity is obtained from a single sensor;* calculating the position of the mounted object, based on the amount of movement and the posture; and discharging a liquid droplet for forming an image at the position depending on the position of the mounted object.

9. A non-transitory computer-readable recording medium having a program stored therein for causing a processor to execute a method of detecting a position on a movement surface of a mounted object, the method comprising:

detecting an amount of movement of the mounted object on the movement surface;

detecting, *from an angular velocity caused by the movement of the mounted object,* at least a posture of the mounted object on the movement surface; *wherein the detected angular velocity is obtained from a single sensor;* calculating the position of the mounted object, based on the amount of movement and the posture; and discharging a liquid droplet for forming an image at the position depending on the position of the mounted object.

*10. A droplet discharging apparatus comprising:*

*a moved amount detector configured to detect an amount of movement of the droplet discharging apparatus on a medium;*

*a posture detector configured to detect, from an angular velocity caused by the movement of the droplet discharging apparatus, at least a posture of the droplet discharging apparatus;*

*a position calculator configured to calculate a position of the droplet discharging apparatus, based on the amount of movement and the posture; and*

*a droplet discharger configured to discharge a liquid droplet for forming an image based on the position of the droplet discharging apparatus calculated by the position calculator.*

*11. The droplet discharging apparatus according to claim 10, wherein the posture detector detects angular velocity of the droplet discharging apparatus that moves during image forming.*

*12. The droplet discharging apparatus according to claim 11, wherein the posture detector detects the angular velocity of the droplet discharging apparatus that is rotated around an axis perpendicular to the medium.*

*13. The droplet discharging apparatus according to claim 11, wherein the position calculator calculates the position, based on the amount of movement and an angle of rotation by adding up the angular velocity.*

*14. The droplet discharging apparatus according to claim 10, further comprising;*

*a memory configured to store an initial position of the droplet discharging apparatus and the amount of movement detected by the moved amount detector;*

*a controller configured to execute initialization of the memory by a power turned on, and indicate that the discharging apparatus is in a state ready once the initialization has been completed.*

*15. The droplet discharging apparatus according to claim 10, wherein the moved amount detector and the posture detector are mounted on a printed circuit board.*

*16. The droplet discharging apparatus according to claim 10, wherein the posture detector is placed away from a heating element inside of the droplet discharging apparatus.*

*17. The droplet discharging apparatus according to claim 10, wherein the posture detector is mounted on a base of the droplet discharging apparatus.*

*18. The droplet discharging apparatus according to claim 10,*

*wherein the droplet discharger has a plurality of droplet discharging parts arranged in a row, and*

*wherein the moved amount detector is arranged in a direction perpendicular to the row of the droplet discharging parts.*

*19. The droplet discharging apparatus according to claim 10, further comprising;*

*a housing to which the posture detector is mounted,*

*wherein the posture detector is mounted at a center position between two walls of the housing.*

*20. A method for detecting a position of a droplet discharging apparatus, the method comprising:*

*detecting an amount of movement of the droplet discharging apparatus on the medium:*

*detecting, from an angular velocity caused by the movement of the droplet discharging apparatus, at least a posture of the droplet discharging apparatus; wherein the detected angular velocity is obtained from a single sensor;*

*calculating a position of the droplet discharging apparatus, based on the amount of movement and the posture; and*

*discharging a liquid droplet for forming an image based on the calculated position of the droplet discharging apparatus.*

* * * * *